US010116485B1

(12) United States Patent
Liu et al.

(10) Patent No.: US 10,116,485 B1
(45) Date of Patent: Oct. 30, 2018

(54) TX/RX IMBALANCE AND CARRIER LEAKAGE CALIBRATION

(71) Applicant: QUALCOMM Incorporated, San Diego, CA (US)

(72) Inventors: Tienyow Liu, Santa Clara, CA (US); James Gardner, San Ramon, CA (US); Jayanand Asok Kumar, Fremont, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 15/799,360

(22) Filed: Oct. 31, 2017

(51) Int. Cl.
| | |
|---|---|
| *H04L 27/36* | (2006.01) |
| *H04B 1/40* | (2015.01) |
| *H04L 27/38* | (2006.01) |
| *H04L 27/00* | (2006.01) |

(52) U.S. Cl.
CPC ............ *H04L 27/367* (2013.01); *H04B 1/40* (2013.01); *H04L 27/364* (2013.01); *H04L 27/3863* (2013.01); *H04L 27/0002* (2013.01)

(58) Field of Classification Search
CPC .................................................. H04L 27/367
USPC ......................................................... 375/296
See application file for complete search history.

(56) References Cited

U.S. PATENT DOCUMENTS

| | | | |
|---|---|---|---|
| 8,050,350 B2 | 11/2011 | Ahirwar et al. | |
| 8,358,997 B2 | 1/2013 | Mo et al. | |
| 8,681,896 B1 | 3/2014 | Chen et al. | |
| 8,885,692 B2 | 11/2014 | Ly-Gagnon | |
| 9,479,203 B2 | 10/2016 | Peng et al. | |
| 2002/0000925 A1* | 1/2002 | Martin | G11C 27/02 341/122 |
| 2007/0202812 A1* | 8/2007 | Park | H04B 1/525 455/75 |

\* cited by examiner

*Primary Examiner* — Lihong Yu
(74) *Attorney, Agent, or Firm* — Paradice and Li LLP/Qualcomm

(57) ABSTRACT

This disclosure provides systems, methods, and apparatus, including computer programs encoded on computer storage media, for contemporaneously estimating transmitter in-phase and quadrature (I/Q) imbalances, receiver I/Q imbalances, and transmit carrier leakage in a wireless transceiver. In some implementations, first, second, and third frequency-domain multi-tone (FDMT) signals transmitted through a calibration path of the wireless transceiver are captured to generate frequency domain representations of the first, second, and third FDMT signals. The frequency domain representations of the first, second, and third FDMT signals may be used to contemporaneously estimate the transmitter I/Q imbalances, receiver I/Q imbalances, and the transmit carrier leakage, which in turn may be used to determine transmitter and receiver I/Q imbalance correction filter coefficients and a transmit carrier leakage correction factor.

26 Claims, 8 Drawing Sheets

TX/RX IMBALANCE AND CARRIER LEAKAGE CALIBRATION

TECHNICAL FIELD

This disclosure relates generally to compensating for signal impairments in wireless transceivers.

DESCRIPTION OF THE RELATED TECHNOLOGY

Many wireless devices implement frequency-division duplexing (FDD) transceivers using Quadrature Amplitude Modulation (QAM) and direct conversion transceivers. Although popular due to their relative simplicity and low cost, QAM transceivers are sensitive to various signal impairments that affect the quality of the transmitted and received signals. The signal impairments may result from non-idealities in the analog front-end (AFE) circuits of QAM transceivers. For example, mismatched active and passive elements (such as quadrature mixers, filters, and analog-to-digital converters) in the in-phase (I) signal path and the quadrature (Q) signal path may introduce I/Q mismatch impairments in the transmitted and received signals. In addition, direct-current (DC) offsets caused by carrier leakage may saturate the transmit and receive paths of the QAM transceiver, which may undesirably reduce the dynamic range of the wireless device. Although many wireless devices include on-chip solutions to compensate for signal impairments caused by carrier leakage and I/Q imbalances, these solutions are time consuming and resource intensive.

SUMMARY

The systems, methods and devices of this disclosure each have several innovative aspects, no single one of which is solely responsible for the desirable attributes disclosed herein.

One innovative aspect of the subject matter described in this disclosure can be implemented in a wireless device to compensate for signal impairments in a wireless transceiver caused by I/Q imbalances and carrier leakage. The wireless transceiver may include a calibration path and a calibration processor. The calibration path may include at least a transmit path and a receive path in the wireless transceiver. The calibration processor may be configured to capture a first frequency-domain multi-tone (FDMT) signal transmitted through the calibration path; generate a frequency-domain representation of the first captured FDMT signal; capture a second FDMT signal transmitted through the calibration path; generate a frequency-domain representation of the second captured FDMT signal; capture a third FDMT signal transmitted through the calibration path; generate a frequency-domain representation of the third captured FDMT signal; estimate transmitter in-phase and quadrature (I/Q) imbalances and receiver I/Q imbalances across an entire bandwidth of the wireless transceiver, and the transmit carrier leakage in the wireless transceiver, contemporaneously based at least in part on the frequency domain representations of the first, second, and third captured FDMT signals; and determine a transmitter I/Q imbalance correction filter coefficient, a receiver I/Q imbalance correction filter coefficient, and a transmit carrier leakage correction factor contemporaneously based on the estimated I/Q imbalances and the estimated transmit carrier leakage.

In some implementations, the estimated transmitter and receiver I/Q imbalances may be based on an average of the frequency-domain representations of the first and second captured FDMT signals and on the frequency-domain representation of the third captured FDMT signal. In some implementations, first FDMT signal may include a known positive transmit carrier leakage correction value, the second FDMT signal may include a known negative transmit carrier leakage correction value, and the third FDMT signal may not include any transmit carrier leakage correction value. In some implementations, the calibration processor may be or may include a digital signal processor (DSP) capable of capturing the FDMT signals in the time-domain and taking a Fourier Transform of the captured signals to generate the frequency-domain representations.

Another innovative aspect of the subject matter described in this disclosure can be implemented as a method for compensating for signal impairments in a wireless transceiver. The method may include providing a calibration path including at least a transmit path and a receive path in the wireless transceiver; capturing a first FDMT signal transmitted through the calibration path; generating a frequency-domain representation of the first captured FDMT signal; capturing a second FDMT signal transmitted through the calibration path; generating a frequency-domain representation of the second captured FDMT signal; capturing a third FDMT signal transmitted through the calibration path; generating a frequency-domain representation of the third captured FDMT signal; estimating transmitter in-phase and quadrature (I/Q) imbalances and receiver I/Q imbalances across an entire bandwidth of the wireless transceiver, and the transmit carrier leakage in the wireless transceiver, contemporaneously based at least in part on the frequency-domain representations of the first, second, and third captured FDMT signals; and determining a transmitter I/Q imbalance correction filter coefficient, a receiver I/Q imbalance correction filter coefficient, and a transmit carrier leakage correction factor contemporaneously based on the estimated I/Q imbalances and the estimated transmit carrier leakage.

Another innovative aspect of the subject matter described in this disclosure can be implemented in a non-transitory computer-readable medium. The non-transitory computer-readable medium can comprise instructions that, when executed by one or more processors in a wireless transceiver, cause the wireless transceiver to compensate for signal impairments by performing a number of operations. In some implementations, the number of operations may include providing a calibration path including at least a transmit path and a receive path of the wireless transceiver; capturing a first FDMT signal transmitted through the calibration path; generating a frequency-domain representation of the first captured FDMT signal; capturing a second FDMT signal transmitted through the calibration path; generating a frequency-domain representation of the second captured FDMT signal; capturing a third FDMT signal transmitted through the calibration path; generating a frequency-domain representation of the third captured FDMT signal; estimating transmitter in-phase and quadrature (I/Q) imbalances and receiver I/Q imbalances, and the transmit carrier leakage in the wireless transceiver, contemporaneously based at least in part on the frequency-domain representations of the first, second, and third captured FDMT signals; and determining a transmitter I/Q imbalance correction filter coefficient, a receiver I/Q imbalance correction filter coefficient, and a transmit carrier leakage correction factor contemporaneously based on the estimated I/Q imbalances and the estimated transmit carrier leakage.

Another innovative aspect of the subject matter described in this disclosure can be implemented in a wireless device. The wireless device may include a calibration path including at least a transmit path and a receive path in the wireless transceiver, and also may include means for capturing a first frequency-domain multi-tone (FDMT) signal transmitted through the calibration path; means for generating a frequency-domain representation of the first captured FDMT signal; means for capturing a second FDMT signal transmitted through the calibration path; means for generating a frequency-domain representation of the second captured FDMT signal; means for capturing a third FDMT signal transmitted through the calibration path; means for generating a frequency-domain representation of the third captured FDMT signal; means for estimating transmitter in-phase and quadrature (I/Q) imbalances and receiver I/Q imbalances across an entire bandwidth of the wireless transceiver, and the transmit carrier leakage in the wireless transceiver, contemporaneously based at least in part on the frequency-domain representations of the first, second, and third captured FDMT signals; and means for determining a transmitter I/Q imbalance correction filter coefficient, a receiver I/Q imbalance correction filter coefficient, and a transmit carrier leakage correction factor contemporaneously based on the estimated I/Q imbalances and the estimated transmit carrier leakage.

Details of one or more implementations of the subject matter described in this disclosure are set forth in the accompanying drawings and the description below. Other features, aspects, and advantages will become apparent from the description, the drawings and the claims. Note that the relative dimensions of the following figures may not be drawn to scale.

BRIEF DESCRIPTION OF THE DRAWINGS

Like reference numbers and designations in the various drawings indicate like elements.

DETAILED DESCRIPTION

Figure 1:
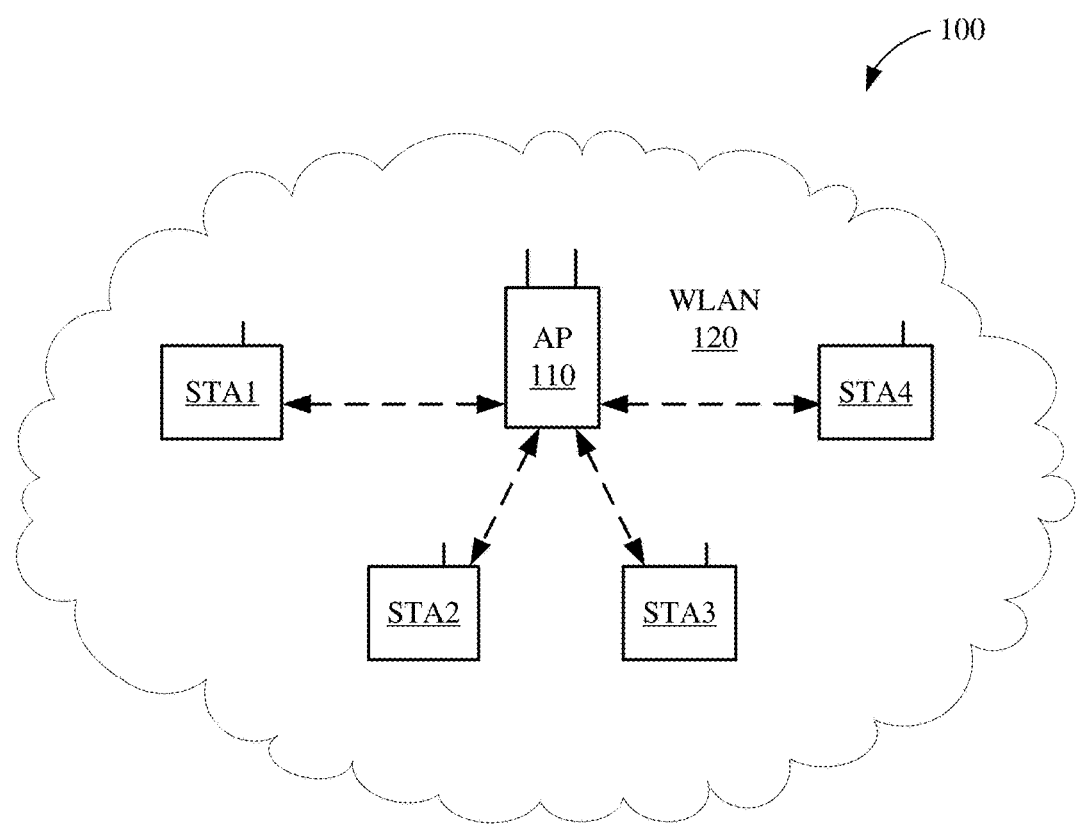
FIG. 1 shows a block diagram of an example wireless system.

The following description is directed to certain implementations for the purposes of describing the innovative aspects of this disclosure. However, a person having ordinary skill in the art will readily recognize that the teachings herein can be applied in a multitude of different ways. The described implementations may be implemented in any device, system or network that is capable of transmitting and receiving RF signals according to any of the IEEE 16.11 standards, or any of the IEEE 802.11 standards, the Bluetooth® standard, code division multiple access (CDMA), frequency division multiple access (FDMA), time division multiple access (TDMA), Global System for Mobile communications (GSM), GSM/General Packet Radio Service (GPRS), Enhanced Data GSM Environment (EDGE), Terrestrial Trunked Radio (TETRA), Wideband-CDMA (W-CDMA), Evolution Data Optimized (EV-DO), 1×EV-DO, EV-DO Rev A, EV-DO Rev B, High Speed Packet Access (HSPA), High Speed Downlink Packet Access (HS-DPA), High Speed Uplink Packet Access (HSUPA), Evolved High Speed Packet Access (HSPA+), Long Term Evolution (LTE), AMPS, or other known signals that are used to communicate within a wireless, cellular or internet of things (IOT) network, such as a system utilizing 3G, 4G or 5G, or further implementations thereof, technology.

Implementations of the subject matter described in this disclosure may be used to compensate for signal impairments caused by carrier leakage and I/Q imbalances in a wireless transceiver of a wireless device. In some implementations, the wireless transceiver may include a transmit path, a receive path, and a loopback path. The loopback path may couple the transmit and receive paths together to form a calibration path. During a calibration operation, a sequence of training signals may be transmitted through the calibration path and captured by a calibration processor. The calibration processor may generate frequency-domain representations of the captured training signals, and estimate transmitter I/Q imbalances, receiver I/Q imbalances, and the transmit carrier leakage of the wireless transceiver based at least in part on the frequency-domain representations of the captured training signals. In some implementations, the calibration processor may estimate the transmitter and receiver I/Q imbalances across an entire bandwidth of the wireless transceiver, and the transmit carrier leakage in the wireless transceiver, contemporaneously. The calibration processor may determine a transmitter I/Q imbalance correction filter coefficient, a receiver I/Q imbalance correction filter coefficient, and a transmit carrier leakage correction factor based at least in part on the estimated I/Q imbalances, the estimated transmit carrier leakage, and one or more of the frequency-domain representations of the captured training signals. In some implementations, the calibration processor may determine the transmitter I/Q imbalance correction filter coefficient, the receiver I/Q imbalance correction filter coefficient, and the transmit carrier leakage correction factor contemporaneously.

In some implementations, the training signals may be transmitted through the calibration path as frequency-domain multi-tone (FDMT) signals. In some implementations, the FDMT signals may include a number of first tones associated with negative frequencies and include a number of second tones associated with positive frequencies, wherein the first tones are offset from the second tones by at least one tone location to mitigate the interference of I/Q imbalance images. The calibration processor may capture the FDMT signals in the time-domain, and may process the captured FDMT signals to generate their corresponding frequency domain representations. In some implementations, the calibration processor may be a digital signal processor (DSP) capable of capturing the FDMT signals in the time-domain and taking a Fourier Transform of the captured signals to generate their corresponding frequency-domain representations. Processing the FDMT signals in the frequency domain (rather than in the time domain) may allow the transmitter and receiver I/Q imbalances to be estimated based on a transmission of two FDMT signals through the calibration path, and also may allow the transmitter I/Q imbalances, the receiver I/Q imbalances, and the transmit carrier leakage to be estimated based on a transmission of three FDMT signals through the calibration path. In addition, processing the FDMT signals in the frequency domain (rather than in the time domain) also may allow the transmitter I/Q imbalances and the receiver I/Q imbalances to be estimated across an entire bandwidth (such as across all frequency locations) of the wireless transceiver contemporaneously.

Particular implementations of the subject matter described in this disclosure can be implemented to realize one or more of the following potential advantages. The ability to contemporaneously estimate transmitter I/Q imbalances, receiver I/Q imbalances, and transmit carrier leakage of a wireless transceiver may reduce the duration and complexity of calibration operations to compensate for signal impairments in the wireless transceiver, for example, as compared with conventional techniques that estimate I/Q imbalances and transmit carrier leakage using a two-dimensional search of the I/Q imbalance correction filter coefficients and transmit carrier leakage correction factors in the time-domain. The calibration operations disclosed herein also may be less prone to unwanted spurs resulting from nonlinearities in various analog components of the wireless transceiver, for example, because the FDMT signals are captured and processed in the frequency domain. Additionally, because I/Q imbalances may be frequency-dependent (such as a transceiver's I/Q imbalances at one frequency may be different than the transceiver's I/Q imbalances at another frequency), the ability to contemporaneously estimate transmitter I/Q imbalances and receiver I/Q imbalances across an entire bandwidth of the wireless transceiver may allow wideband transceivers to be calibrated to compensate for I/Q imbalances more quickly and more efficiently than conventional techniques.

As used herein, the term "contemporaneously" may refer to performing multiple operations at the same time or to performing multiple operations during the same time period but not necessarily simultaneously. Thus, as used herein, the term "contemporaneously estimating" may indicate estimating I/Q imbalances and transmit carrier leakage at the same time or may indicate estimating I/Q imbalances and transmit carrier leakage during the same time period but not necessarily simultaneously, and the "contemporaneously determining" may indicate determining transmitter and receiver I/Q imbalance correction filter coefficients and transmit carrier leakage correction factors at the same time or may indicate determining transmitter and receiver I/Q imbalance correction filter coefficients and transmit carrier leakage correction factors during the same time period but not necessarily simultaneously.

FIG. 1 shows a block diagram of an example wireless system 100. The wireless system 100 is shown to include four wireless stations STA1-STA4, a wireless access point (AP) 110, and a wireless local area network (WLAN) 120. The WLAN 120 may be formed by a plurality of Wi-Fi access points (APs) that may operate according to the IEEE 802.11 family of standards (or according to other suitable wireless protocols). Although only one AP 110 is shown in FIG. 1 for simplicity, it is to be understood that WLAN 120 may be formed by any number of access points such as the AP 110. The AP 110 is assigned a unique media access control (MAC) address that is programmed therein by, for example, the manufacturer of the access point. Similarly, each of the stations STA1-STA4 is also assigned a unique MAC address. In some implementations, the wireless system 100 may correspond to a multiple-input multiple-output (MIMO) wireless network, and may support single-user MIMO (SU-MIMO) and multi-user MIMO (MU-MIMO) communications. Further, although the WLAN 120 is depicted in FIG. 1 as an infrastructure basic service set (BSS), in some other implementations, the WLAN 120 may be an independent basic service set (IBSS), an ad-hoc network, or a peer-to-peer (P2P) network (such as operating according to the Wi-Fi Direct protocols).

Each of the stations STA1-STA4 may be any suitable Wi-Fi enabled wireless device including, for example, a cell phone, personal digital assistant (PDA), tablet device, laptop computer, or the like. Each of the stations STA1-STA4 also may be referred to as a user equipment (UE), a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. In some implementations, each of the stations STA1-STA4 may include one or more transceivers, one or more processing resources (such as processors and ASICs), one or more memory resources, and a power source (such as a battery). The memory resources may include a non-transitory computer-readable medium (such as one or more nonvolatile memory elements, such as EPROM, EEPROM, Flash memory, a hard drive, etc.) that stores instructions for performing operations described with respect to FIG. 8.

The AP 110 may be any suitable device that allows one or more wireless devices to connect to a network (such as a local area network (LAN), a wide area network (WAN), a metropolitan area network (MAN), and the Internet) via the AP 110 using Wi-Fi, Bluetooth, or any other suitable wireless communication standards. In some implementations, the AP 110 may include one or more transceivers, one or more processing resources (such as processors and ASICs), one or more memory resources, and a power source. The memory resources may include a non-transitory computer-readable medium (such as one or more nonvolatile memory elements, such as EPROM, EEPROM, Flash memory, a hard drive, etc.) that stores instructions for performing operations described with respect to FIG. 8.

The one or more transceivers included within the stations STA1-STA4 and the AP 110 may include Wi-Fi transceivers, Bluetooth transceivers, cellular transceivers, and other suitable radio frequency (RF) transceivers (not shown for simplicity) to transmit and receive wireless communication signals. Each transceiver may communicate with other wireless devices in distinct operating frequency bands and using distinct communication protocols. For example, the Wi-Fi transceiver may communicate within a 2.4 GHz frequency band, within a 5 GHz frequency band in accordance with the IEEE 802.11 specification, and within a 60 GHz frequency band. The cellular transceiver may communicate within various RF frequency bands in accordance with a 4G Long Term Evolution (LTE) protocol described by the 3rd Generation Partnership Project (3GPP) (such as between approximately 700 MHz and approximately 3.9 GHz) and in accordance with other cellular protocols (such as a Global System for Mobile (GSM) communications protocol). In some other implementations, the transceivers included within each of the stations STA1-STA4 or the AP 110 may be any technically feasible transceiver such as a ZigBee transceiver described by a specification from the ZigBee specification, a WiGig transceiver, and a HomePlug transceiver described a specification from the HomePlug Alliance.

Figure 2:
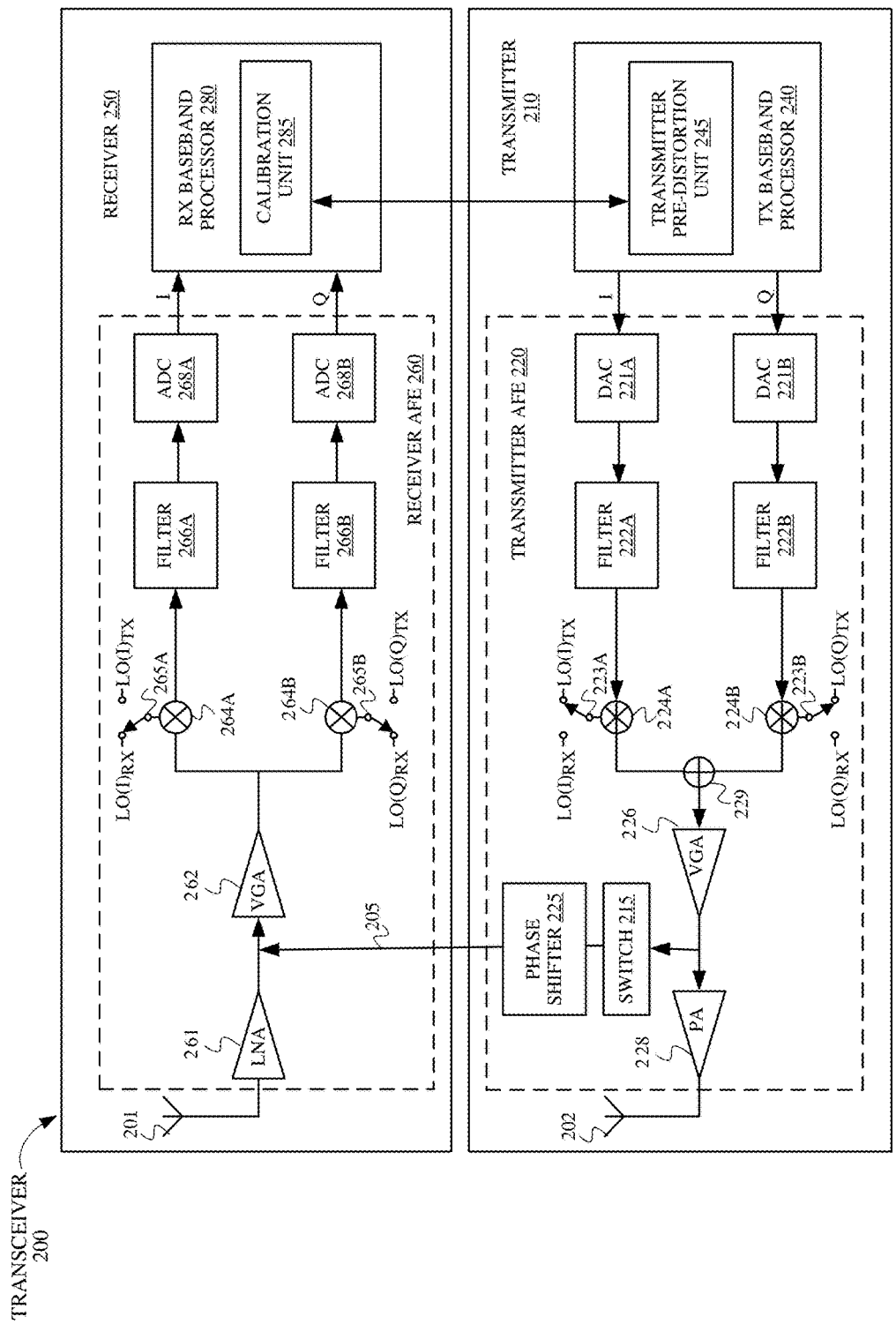
FIG. 2 shows a block diagram of an example quadrature amplitude modulation (QAM) transceiver.

FIG. 2 shows a block diagram of a quadrature amplitude modulation (QAM) transceiver 200. The transceiver 200 may be included within any suitable wireless device including, for example, the AP 110 of FIG. 1, the stations STA1-STA4 of FIG. 1, or both. The transceiver 200 includes a transmitter 210, a receiver 250, and a loopback path 205 coupled between the transmitter 210 and the receiver 250.

The transmitter 210 is coupled to one or more antennas 202, and includes a transmitter analog front-end (AFE) 220 and a transmitter baseband processor 240. The transmitter baseband processor 240 includes a transmitter pre-distortion unit 245. For the in-phase (I) signal path, the transmitter AFE 220 includes a digital-to-analog converter (DAC) 221A, a filter 222A, and a local oscillator (LO) mixer 224A. For the quadrature (Q) signal path, the transmitter AFE 220 includes a DAC 221B, a filter 222B, an LO mixer 224B, a variable gain amplifier (VGA) 226, and a power amplifier (PA) 228. The mixer 224A up-converts an in-phase (I) transmit signal from baseband directly to the carrier frequency by mixing the I transmit signal with an in-phase transmit local oscillator signal $LO(I)_{TX}$, and the mixer 224B up-converts a quadrature (Q) transmit signal from baseband directly to the carrier frequency by mixing the Q transmit signal with a quadrature transmit local oscillator signal $LO(Q)_{TX}$. The frequency of the transmit LO signals $LO(I)_{TX}$ and $LO(Q)_{TX}$ is ideally the carrier frequency. A combiner 229 combines the up-converted signals output from the mixers 224A-224B to generate a QAM signal. The VGA 226 and the PA 228 amplify the QAM signal prior to transmission from the one or more antennas 202. Mismatch between the mixers 224A-224B, mismatch between the filters 222A-222B, and mismatch between the DACs 221A-221B may result in transmitter-side I/Q mismatch.

The receiver 250 is coupled to one or more antennas 201, and includes a receiver AFE 260 and a receiver baseband processor 280. In some implementations, the receiver baseband processor 280 may include an I/Q mismatch calibration unit 285. For the I signal path, the receiver AFE 260 includes a low-noise amplifier (LNA) 261, a VGA 262, an LO mixer 264A, a filter 266A, and an analog-to-digital converter (ADC) 268A. For the Q signal path, the receiver AFE 260 includes an LO mixer 264B, a filter 266B, and an ADC 268B. The mixer 264A directly down-converts a received signal (such as a signal received from the one or more antennas 201) into a baseband in-phase (I) signal by mixing the received signal with an in-phase receive local oscillator signal $LO(I)_{RX}$, and the mixer 264B directly down-converts the received signal into a baseband quadrature (Q) signal by mixing the received signal with a quadrature receive local oscillator signal $LO(Q)_{RX}$. The frequency of the local oscillator signals $LO(I)_{RX}$ and $LO(Q)_{RX}$ is ideally the carrier frequency. Mismatch between the mixers 264A-264B, mismatch between the filters 266A-266B, and mismatch between the between ADCs 268A-268B may result in receiver-side I/Q mismatch.

The transmitter AFE 220 also may include a pair of switches 223A and 223B. The switch 223A is coupled to the mixer 224A, and may provide either the transmit local oscillator signal $LO(I)_{TX}$ or the receive local oscillator signal $LO(I)_{RX}$ to the mixer 224A. The switch 223B is coupled to the mixer 224B, and may provide either the transmit local oscillator signal $LO(Q)_{TX}$ or the receive local oscillator signal $LO(Q)_{RX}$ to the mixer 224B. Similarly, the receiver AFE 260 also may include a pair of switches 265A and 265B. The switch 265A is coupled to the mixer 264A, and may provide either the receive local oscillator signal $LO(I)_{RX}$ or the transmit local oscillator signal $LO(I)_{TX}$ to the mixer 264A. The switch 265B is coupled to the mixer 264B, and may provide either the receive local oscillator signal $LO(Q)_{RX}$ or the transmit local oscillator signal $LO(Q)_{TX}$ to the mixer 264B.

The loopback path 205 may be used during calibration operations to facilitate the estimation of I/Q imbalances and carrier leakage in the transceiver 200. A number of I/Q imbalance correction filter coefficients and carrier leakage correction factors may be generated based on the estimated I/Q imbalances and carrier leakage, and then used to calibration one or more components of the transceiver 200 to compensate for signal impairments resulting from I/Q imbalances and carrier leakage in the transceiver 200.

During normal operation, the receiver AFE 260 and the transmitter AFE 220 may operate at distinct frequencies. For example, during normal operation, the switches 265A and 265B in the receiver AFE 260 provide the receive local oscillator signals $LO(I)_{RX}$ and $LO(Q)_{RX}$ to mixers 264A and 264B, respectively. The local oscillator signals $LO(I)_{RX}$ and $LO(Q)_{RX}$ have a frequency corresponding to the carrier frequency of received signals. In some implementations, the frequency of $LO(I)_{RX}$ and $LO(Q)_{RX}$ differs from the carrier frequency of received signals by a carrier frequency offset (CFO) that is a source of signal impairment. Similarly, the switches 223A and 223B in the transmitter AFE 220 provide the transmit local oscillator signals $LO(I)_{TX}$ and $LO(Q)_{TX}$ to the mixers 224A and 224B, respectively. The frequency of the local oscillator signals $LO(I)_{TX}$ and $LO(Q)_{TX}$ is the carrier frequency of the transmitted signals, and is distinct from the frequency of the local oscillator signals $LO(I)_{RX}$ and $LO(Q)_{RX}$.

During a transmitter calibration mode, the switches 265A and 265B in the receiver AFE 260 may provide the transmit LO signals to respective mixers 264A and 264B, and the switches 223A and 223B in the transmitter AFE 220 may provide the transmit LO signals to respective mixers 224A and 224B. More specifically, during the transmitter calibration mode, the switches 265A and 223A provide the in-phase transmit signal $LO(I)_{TX}$ to respective mixers 264A and 224A, and the switches 265B-223B provide the quadrature transmit $LO(Q)_{TX}$ to respective mixers 264B and 224B. In this manner, the switches 265A-265B in the receiver AFE 260 and the switches 223A-223B in the transmitter AFE 220 may allow the transmitter 210 and receiver 250 to operate at the same frequency during the transmitter calibration mode, for example, so that the transceiver 200 may perform loop-back calibration to compensate for I/Q mismatch in the transmitter 210.

During a receiver calibration mode, the switches 265A and 265B in the receiver AFE 260 may provide the receive LO signals to respective mixers 264A and 264B, and the switches 223A and 223B in the transmitter AFE 220 may provide the receive LO signals to respective mixers 224A and 224B. More specifically, the switches 265A and 223A provide the in-phase receive signal $LO(I)_{RX}$ to respective mixers 264A and 224A, and the switches 265B and 223B provide the quadrature receive $LO(Q)_{RX}$ to respective mixers 264B and 224B. In this manner, the switches 265A-265B in the receiver AFE 260 and the switches 223A-223B in the transmitter AFE 220 may allow the transmitter 210 and receiver 250 to operate at the same frequency during the receiver calibration mode, for example, so that the transceiver 200 may perform loop-back calibration to compensate for I/Q mismatch in the receiver unit 260.

In some implementations, the loopback path 205 may include a switch 215 and a phase shifter 225. The switch 215 may be a transistor or any other suitable type of switch that can selectively couple the loopback path 205 between the transmitter 210 and the receiver 250. The phase shifter 225 may be used during calibration operations to selectively add a phase shift to training signals routed from the transmitter 210 to the receiver 250. In some implementations, the phase shifter 225 may include a bypass switch (not shown for simplicity) that allows the phase shifter 225 to operate in a "bypass" state or in a "phase shift" state. For example, the phase shifter 225 may add a phase shift to the training signals when operating in the phase shift state, and may not add a phase shift to the training signals when operating in the bypass state. Although the switch 215 and the phase shifter 225 are shown in FIG. 2 as residing within the transmitter 210, in some other implementations, the switch 215 and the phase shifter 225 may reside within the receiver 250. In some other implementations, the switch 215 and the phase shifter 225 may be separate from the transmitter 210 and the receiver 250.

The switch 215 may open the loopback path 205 during normal operation of the transceiver 200, and may close the loopback path 205 during calibration operations of the transceiver 200. In some implementations, the loopback path 205 may couple the output of the VGA 226 in the transmitter AFE 220 to the input of the VGA 262 in the receiver AFE 260 during calibration operations (such as depicted in the example of FIG. 2). In this manner, the loopback path 205 may couple the transmit path of the transmitter 210 to the receive path of the receiver 250 so that one or more training signals may be propagated through the transmit path, routed to the receive path by the loopback path, and then propagated through the receive path to the calibration unit 285. The signal path formed by the transmit path, the loopback path 205, and the receive path during calibration operations may be referred to herein as the calibration path. In some other implementations, the loopback path 205 may be coupled to a different node of the transmitter 210, may be coupled to a different node of the receiver 250, or both.

During calibration operations, a number of training signals may be generated and transmitted through the transmitter 210, looped to the receiver 250 via the loopback path 205, and then transmitted through the receiver 250. The calibration unit 285 may capture and process the received training signals to estimate I/Q imbalances in the transmitter 210, to estimate I/Q imbalances in the receiver 250, and to estimate transmitter carrier leakage (TXCL) contemporaneously. The calibration unit 285 may use the estimated I/Q imbalances and transmit carrier leakage to determine a transmitter I/Q imbalance correction filter coefficient, a receiver I/Q imbalance correction filter coefficient, and one or more transmit carrier leakage correction factors, which in turn may be used to compensate for signal impairments in the transceiver 200.

Figure 3:
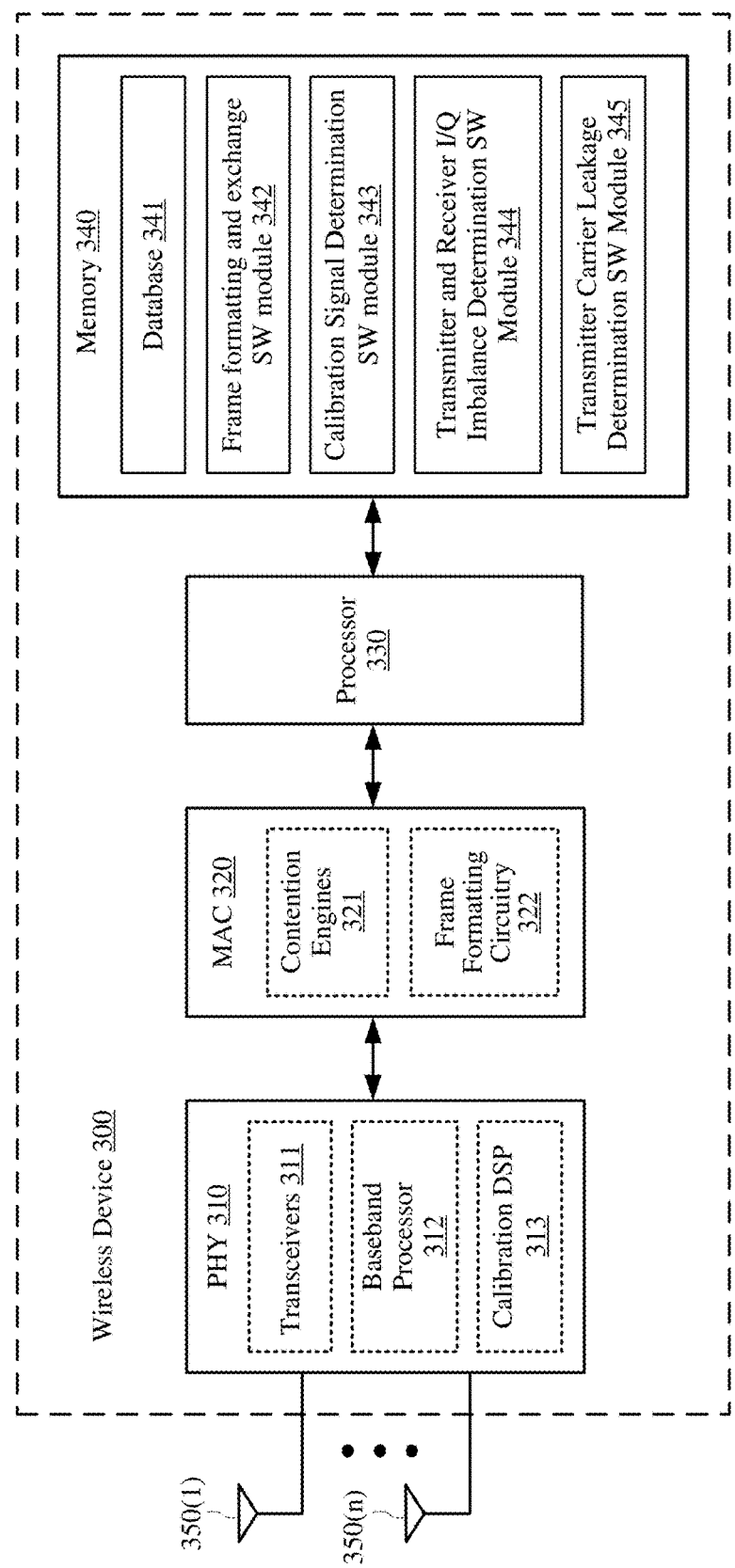
FIG. 3 shows a block diagram of an example wireless device.

FIG. 3 shows a block diagram of an example wireless device 300. The wireless device 300 may be one implementation of the stations STA1-STA4 of FIG. 1, may be one implementation of the AP 110 of FIG. 1, or both. The wireless device 300 may include at least a physical-layer device (PHY) 310, a medium access controller (MAC) 320, a processor 330, a memory 340, and a number of antennas 350(1)-350(n). The PHY 310 may include at least a number of transceivers 311, a baseband processor 312, and calibration digital signal processor (DSP) 313. The transceivers 311 may be coupled to antennas 350(1)-350(n), either directly or through an antenna selection circuit (not shown for simplicity). The transceivers 311 may be used to transmit signals to and receive signals from other wireless devices (such the AP 110 or the stations STA1-STA4 of FIG. 1), and may be used to scan the surrounding environment to detect and identify nearby access points and other wireless devices (such as within wireless range of the wireless device 300). Although not shown in FIG. 3 for simplicity, the transceivers 311 may include any number of transmit chains to process and transmit signals to other wireless devices via antennas 350(1)-350(n), and may include any number of receive chains to process signals received from antennas 350(1)-350(n). In some implementations, the wireless device 300 may be configured for MIMO operations. The MIMO operations may include SU-MIMO operations and MU-MIMO operations.

The baseband processor 312 may be used to process signals received from the processor 330 and the memory 340 and to forward the processed signals to the transceivers 311 for transmission via one or more of the antennas 350(1)-350(n), and may be used to process signals received from one or more of the antennas 350(1)-350(n) via the transceivers 311 and to forward the processed signals to the processor 330 and the memory 340.

The calibration DSP 313 may be configured to estimate I/Q imbalances and transmit carrier leakage across an entire bandwidth of a given transceiver 311, and to determine a number of correction filter coefficients based on the estimated I/Q imbalances and transmit carrier leakage. The determined correction filter coefficients may be used to compensate for signal impairments in the transceivers 313 caused by I/Q imbalances and transmit carrier leakage. In some implementations, a number of training signals (such as a sequence of training signals) may be transmitted through a transmit path of the given transceiver 313, looped back to a receive path of the given transceiver 313, and then transmitted through the receive path of the given transceiver 313. The calibration DSP 313 may capture and process the received training signals in the frequency domain to estimate the transmitter and receiver I/Q imbalances across an entire bandwidth of the transceiver 300, as well the transmit carrier leakage, contemporaneously. The calibration DSP 313 may use the estimated transmitter I/Q imbalances, the estimated receiver I/Q imbalances, and the estimated transmit carrier leakage to determine a transmitter I/Q imbalance correction filter coefficient, a receiver I/Q imbalance correction filter coefficient, and one or more transmit carrier leakage correction factors. The determined transmitter I/Q imbalance correction filter coefficient, receiver I/Q imbalance correction filter coefficient, and transmit carrier leakage correction factors may be used to compensate for signal impairments in the given transceiver 313.

In some implementations, the transmitter I/Q imbalance correction filter coefficient may be used to pre-correct for I/Q imbalances in the transmit path, the receiver I/Q imbalance correction filter coefficient may be used to pre-correct for I/Q imbalances in the receive path, and the transmit carrier leakage correction factors may be used to pre-correct for carrier leakage in the given transceiver 313. Because I/Q imbalances in the transceiver 300 may be frequency-dependent (such as the transceiver 300 exhibiting different I/Q imbalances at different frequencies), the ability of the calibration DSP 313 to contemporaneously estimate both transmitter I/Q imbalances and receiver I/Q imbalances across all transmission and reception frequencies of the transceiver 300 may increase the speed with which the transceiver 300 can be calibrated to compensate for I/Q imbalances (such as compared with conventional I/Q imbalance compensation techniques which operate in the time domain).

The MAC 320 may include at least a number of contention engines 321 and frame formatting circuitry 322. For purposes of discussion herein, the MAC 320 is shown in FIG. 3 as being coupled between the PHY 310 and the processor 330. In actual implementations, the PHY 310, the MAC 320, the processor 330, and the memory 340 may be connected together using one or more buses (not shown for simplicity).

The contention engines 321 may contend for access to one or more shared wireless mediums, and also may store packets for transmission over the one or more shared wireless mediums. In some other implementations, the contention engines 321 may be separate from the MAC 320. In still other implementations, the contention engines 321 may be implemented as one or more software modules (such as stored in the memory 340 or stored in memory provided within the MAC 320) containing instructions that, when executed by the processor 330, perform the functions of the contention engines 321.

The frame formatting circuitry 322 may be used to create and format frames received from the processor 330 and the memory 340 (such as by adding MAC headers to PDUs provided by the processor 330), and may be used to re-format frames received from the PHY 310 (such as by stripping MAC headers from frames received from the PHY 310). In some implementations, the frame formatting circuitry 322 may be used to append a packet extension to packets to be transmitted from the wireless device 300.

The memory 340 may include a database 341 that may store location data, configuration information, data rates, MAC addresses, and other suitable information about (or pertaining to) a number of access points, stations, and other wireless devices. The database 341 also may store profile information for a number of wireless devices. The profile information for a given wireless device may include information including, for example, the wireless device's service set identification (SSID), channel information, received signal strength indicator (RSSI) values, goodput values, channel state information (CSI), and connection history with the wireless device 300.

Figure 8:
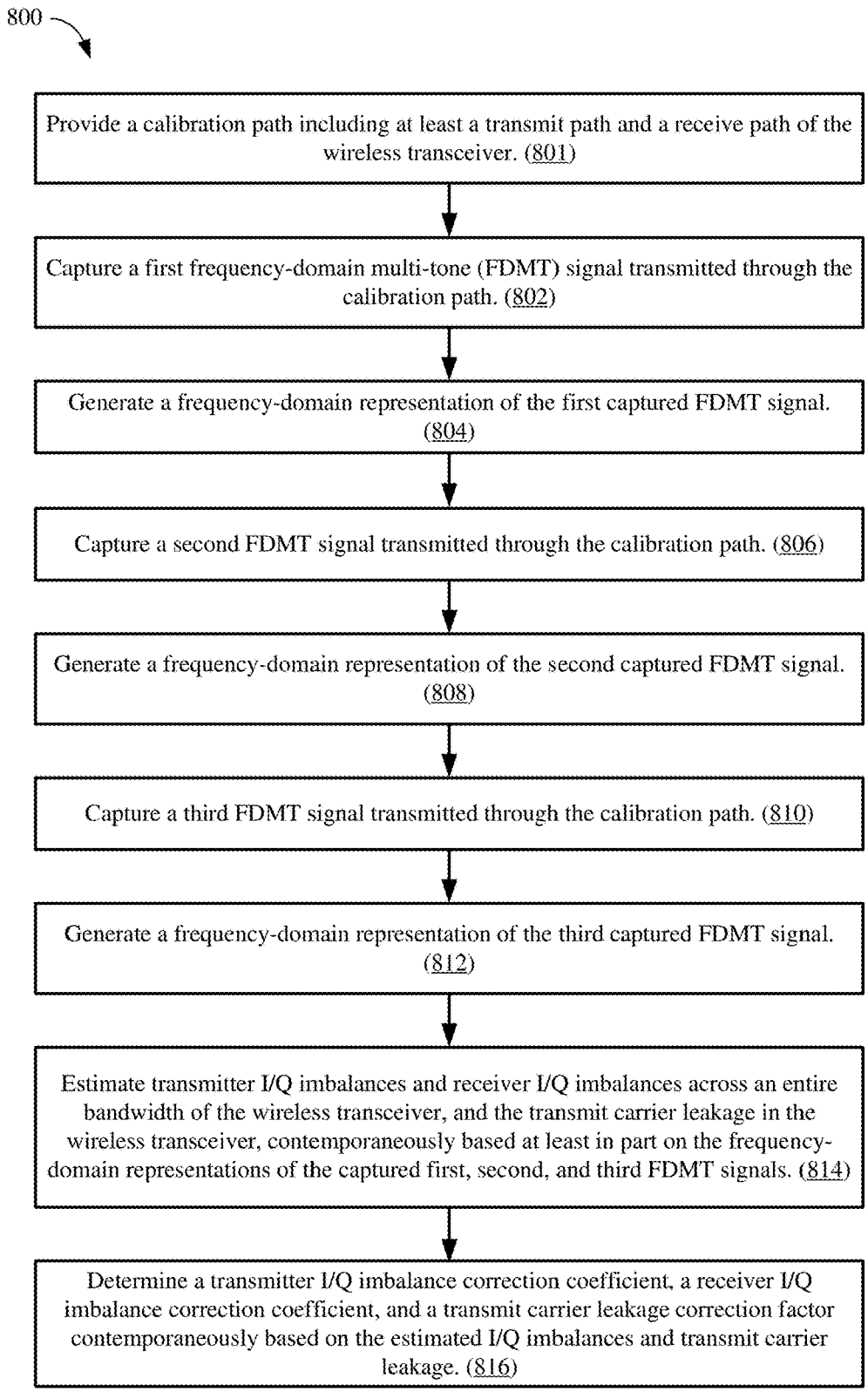
FIG. 8 shows an illustrative flow chart depicting an example operation for calibrating a QAM transceiver.

The memory 340 also may include a non-transitory computer-readable medium (such as one or more nonvolatile memory elements, such as EPROM, EEPROM, Flash memory, a hard drive, and so on) that may store the following software (SW) modules:
  a frame formatting and exchange SW module 342 to facilitate the creation and exchange of any suitable frames (such as data frames, action frames, and management frames) between the wireless device 300 and other wireless devices, for example, as described for one or more operations of FIG. 8;
  a calibration signal determination SW module 343 to generate and transmit a number of training signals through a calibration path of a transceiver, for example, as described for one of more operations of FIG. 8;
  an I/Q imbalance determination SW module 344 to estimate transmitter I/Q imbalances and receiver I/Q imbalances in the transceivers 313 based at least in part on captured training signals, correction filter coefficient for example, as described for one or more operations of FIG. 8; and
  a transmit carrier leakage determination SW module 345 to estimate transmit carrier leakage in the transceivers 313 based at least in part on the captured training signals and the determined I/Q imbalance correction filter coefficients, for example, as described for one or more operations of FIG. 8.

Each software module includes instructions that, when executed by the processor 330, cause the wireless device 300 to perform the corresponding functions. The non-transitory computer-readable medium of the memory 340 thus includes instructions for performing all or a portion of the operations of FIG. 8.

The processor 330 may be one or more suitable processors capable of executing scripts or instructions of one or more software programs stored in the wireless device 300 (such as within the memory 340). For example, the processor 330 may execute the frame formatting and exchange SW module 342 to facilitate the creation and exchange of any suitable frames (such as data frames, action frames, and management frames) between the wireless device 300 and other wireless devices.

The processor 330 may execute the calibration signal determination SW module 343 to generate and transmit a number of training signals through a calibration path of a transceiver. In some implementations, the training signals may be frequency domain multi-tone (FDMT) waveforms, for example, as described with respect to FIGS. 6 and 7. The processor 330 may execute the I/Q imbalance determination SW module 344 to contemporaneously estimate transmitter I/Q imbalances and receiver I/Q imbalances in the transceivers 313 across an entire bandwidth of the wireless device 300 based at least in part on training signals captured in the frequency domain. The processor 330 may execute the transmit carrier leakage determination SW module 345 to estimate transmit carrier leakage in the transceivers 313 based at least in part on the captured training signals and the estimated transmitter and receiver I/Q imbalances.

Figure 4:
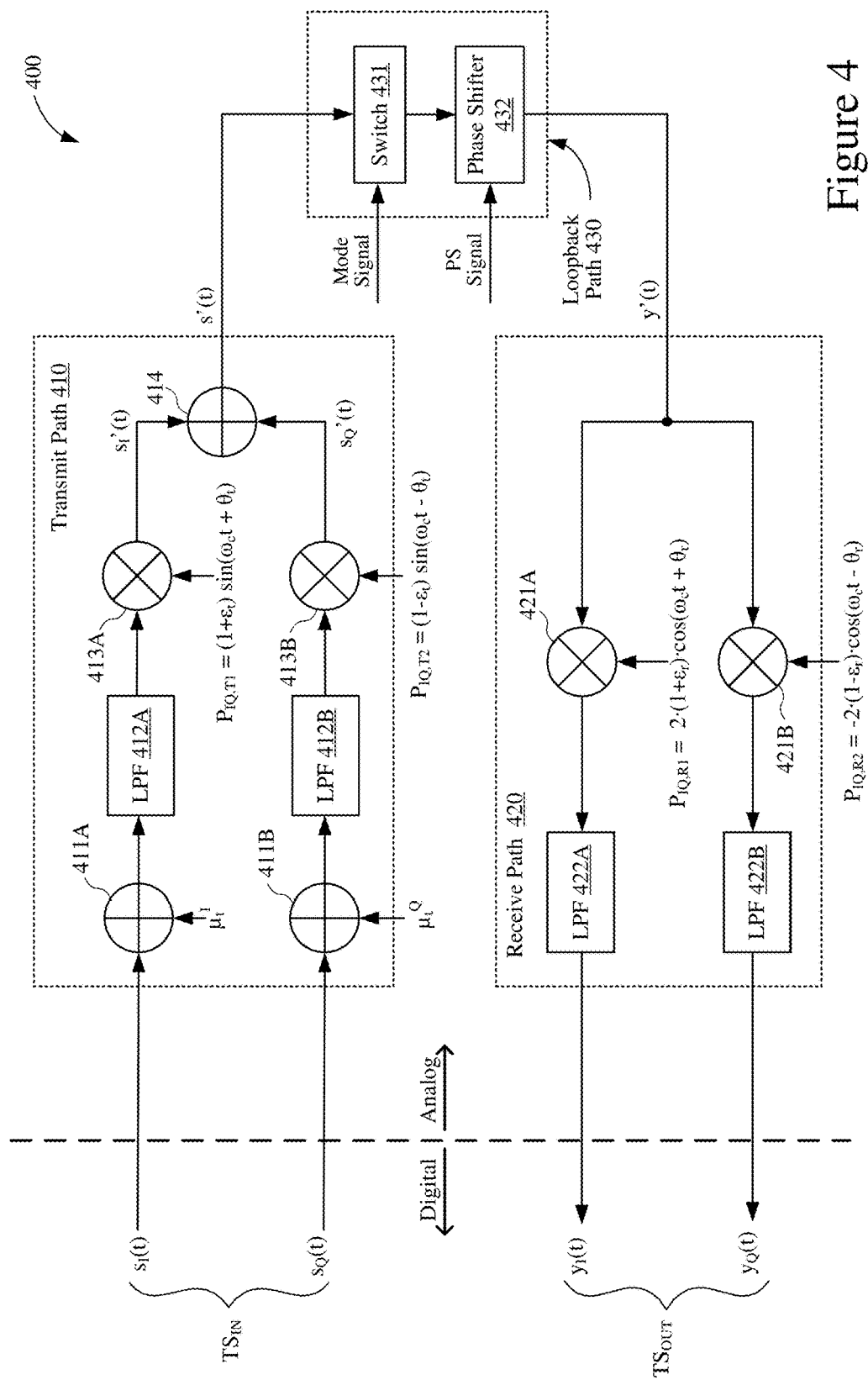
FIG. 4 shows an example model of signal impairments associated with a QAM transceiver.

FIG. 4 shows an example model 400 of signal impairments associated with a QAM transceiver. In some implementations, the example model 400 may be indicative of signal impairments in the QAM transceiver 200 of FIG. 2. In some other implementations, the example model 400 may be indicative of signal impairments in the transceivers 311 of FIG. 3. The example model 400 may include a transmit path 410, a receive path 420, and a loopback path 430. In some implementations, the transmit path 410 may correspond to or characterize a wireless transmitter, and the receive path 420 may correspond to or characterize a wireless receiver. Although the example model 400 includes one transmit path 410 and one receive path 420, it is to be understood that a transceiver having multiple transmit and receive chains may be characterized by a corresponding multitude of instances of the example model 400.

The example model 400 may illustrate the use of one or more training signals transmitted through a calibration path formed by the transmit path 410, the receive path 420, and the loopback path 430 to determine transmitter I/Q imbalance correction filter coefficients, receiver I/Q imbalance correction filter coefficients, and transmit carrier leakage (TXCL) correction factors that can be used to compensate for signal impairments in the transceiver. In the example model 400 of FIG. 4, a real portion (such as the in-phase components) of the TXCL may be modeled by a first correction factor $\mu_t^I$, and an imaginary portion (such as the quadrature components) of the TXCL may be modeled by a second correction factor $\mu_t^Q$. The amplitude imbalance of the transmit path 410 may be modeled by a value $\varepsilon_t$, and the amplitude imbalance of the receive path 420 may be modeled by a value $\varepsilon_r$. The phase imbalance of the transmit path 410 may be modeled by a value $\theta_t$, and the phase imbalance of the receive path 420 may be modeled by a value $\theta_r$.

In some implementations, a sequence of training signals may be generated in the digital domain, transmitted along the analog calibration path of the transceiver, and then processed in the digital domain to estimate transmitter I/Q imbalances, receiver I/Q imbalances, and the transmit carrier leakage associated with the transceiver. Specifically, a sequence of training signals may be transmitted through the transmit path 410, routed to the receive path 420 by the loopback path 430, and then transmitted through the receive path 420 of the transceiver. The training signals may be captured in the digital domain and processed to estimate the transmitter I/Q imbalances, the receiver I/Q imbalances, and the carrier leakage of the transceiver. In some implementations, the training signal may be expressed as $\tilde{s}(t)=s_I(t)+j \cdot s_Q(t)$, where $s_I(t)$ represents the real portion of the training signal, and $j \cdot s_Q(t)$ represents the imaginary portion of the training signal.

The transmit path 410 includes a first adder 411A, a first low-pass filter (LPF) 412A, and a first mixer 413A to process the in-phase (I) signal components $s_I(t)$ of the training signal, and includes a second adder 411B, a second LPF 412B, and a second mixer 413B to process the quadrature (Q) signal components $s_Q(t)$ of the training signal. The transmit path 410 also includes a combiner 414 having inputs coupled to respective outputs of the first and second mixers 413A-413B, and having an output coupled to the loopback path 430. In some implementations, the first LPF 412A may be one implementation of the filter 222A of FIG. 3, the first mixer 413A may be one implementation of the mixer 224A of FIG. 3, the second LPF 412B may be one implementation of the filter 222B of FIG. 3, the second mixer 413B may be one implementation of the mixer 224B of FIG. 3, and the combiner 414 may be one implementation of the summer 229 of FIG. 3.

The loopback path 430 includes a switch 431 and a phase shifter 432. The switch 431, which may be any suitable switching element or circuit (such as a transistor), may selectively couple the loopback path 430 between the transmit path 410 and the receive path 420 based on a mode signal. When the mode signal is in a first state (such as during calibration operations), the switch 431 couples the receive path 420 to the transmit path 410 via the loopback path 430, for example, so that a transmit output signal s'(t) propagated through the transmit path 410 is routed to the receive path 420 via the loopback path 430. When the mode signal is in a second state (such as during normal operations), the switch 431 isolates the receive path 420 from the transmit path 410, for example, so that transmit output signals are not routed from the transmit path 410 to the receive path 420. The mode signal may be generated by any suitable circuit, device, controller, or processor associated with the QAM transceiver. In some implementations, the mode signal may be generated by the calibration unit 285 of FIG. 2 or by the calibration DSP 313 of FIG. 3. In some other implementations, the mode signal may be generated by the processor 330 of FIG. 3 during execution of one or more of the software modules stored in the memory 340.

The phase shifter 432, which may be of any suitable configuration, may selectively add a phase shift to the training signals based on a phase shift (PS) signal. For example, when the PS signal is in a first state, the phase shifter 432 may operate in the phase shift state and add a phase shift to the training signals. When the PS signal is in a second state, the phase shifter 432 may operate in the bypass state and not add a phase shift to the training signals. The PS signal may be generated by any suitable circuit, device, controller, or processor associated with the QAM transceiver. In some implementations, the PS signal may be generated by the calibration unit 285 of FIG. 2 or by the calibration DSP 313 of FIG. 3. In some other implementations, the PS signal may be generated by the processor 330 of FIG. 3 during execution of one or more of the software modules stored in the memory 340.

For the example of FIG. 4, when operating in the phase shift state, the phase shifter 432 may add a phase shift to the transmit output signal s'(t) to generate a phase-shifted output signal y'(t). In some implementations, the phase-shifted output signal may be expressed as $\tilde{y}(t)=y_I(t)+j \cdot y_Q(t)$, where $y_I(t)$ represents the real portion of the phase-shifted output signal, and $j \cdot y_Q(t)$ represents the imaginary portion of the phase-shifted output signal.

The receive path 420 includes a first mixer 421A and a first LPF 422A to process the in-phase (I) signal components $y'_I(t)$ of the phase-shifted output signal y'(t) to generate in-phase signal components $y_I(t)$ of a receive output signal y(t), and includes a second mixer 421B and a second LPF 422B to process the quadrature (Q) signal components $y'_Q(t)$ of the phase-shifted output signal y'(t) to generate quadrature signal components $y_Q(t)$ of the receive output signal y(t). In some implementations, the first mixer 421A may be one implementation of the mixer 264A of FIG. 3, the first LPF 422A may be one implementation of the filter 266A of FIG. 3, the second mixer 421B may be one implementation of the mixer 264B of FIG. 3, the second LPF 422B may be one implementation of the filter 266B of FIG. 3.

During a calibration operation, the training signal $\tilde{s}(t)$ is provided as a stimulation waveform to the transmit path 410, and the mode signal may be set to the first state. The first adder 411A may combine the real signal component $s_I(t)$ of the training signal and the real signal component $\mu_t^I$ of the TXCL correction factor to generate a leakage-compensated I signal component, and the second adder 411B may combine the imaginary signal component $s_Q(t)$ of the training signal and the imaginary signal component $\mu_t^Q$ of the TXCL correction factor to generate a leakage-compensated Q signal component. The leakage-compensated I signal component is filtered by the first LPF 412A, and then modulated with a carrier frequency $\omega_c$ by the first mixer 413A. The leakage-compensated Q signal component is filtered by the second LPF 412B, and then modulated with the carrier frequency $\omega_c$ by the second mixer 413B.

In some implementations, the first mixer 413A may compensate for the amplitude imbalance $\varepsilon_t$ and the phase imbalance $\theta_t$ in the transmit path 410 by modulating the leakage-compensated I signal component with a first transmit I/Q imbalance parameter $P_{IQ,T1}=(1+\varepsilon_t)\sin(\omega_c t+\theta_t)$, and the second mixer 413B may compensate for the amplitude imbalance $\varepsilon_t$ and the phase imbalance $\theta_t$ in the transmit path 410 by modulating the leakage-compensated Q signal component with a second transmit I/Q imbalance parameter $P_{IQ,T2}=(1-\varepsilon_t)\sin(\omega_c t-\theta_t)$.

The resulting I and Q signal components generated by the first and second mixers 413A-413B may be combined by the summer 414 to generate the transmit output signal s'(t). In some implementations, the transmit output signal may be expressed as $s'(t)=(t)=\text{Re}\{\tilde{s}'(t) \cdot e^{j\omega_c t}\}=\text{Re}\{(s'_I(t)+js'_Q(t)) \cdot e^{j\omega_c t}\}$. The complex envelope of the transmit output signal may be expressed as:

$$\tilde{s}'(t)=\alpha_t \cdot \tilde{s}(t)+j \cdot \beta_t \cdot \tilde{s}^*(t)$$

where $\alpha_t=\cos\theta_t+j \cdot \varepsilon_t \sin\theta_t$ and $\beta_t=\varepsilon_t \cos\theta_t+j \cdot \sin\theta_t$. For simplicity, the TXCL correction factors are omitted from the above equations.

The transmit output signal s'(t) is routed through the switch 431 to the phase shifter 432. In some implementations, the phase shifter 432 may be modeled as a channel having an output expressed as:

$$y'(t) = Re\{\tilde{y}'(t) \cdot e^{j\omega_c t}\} = Re\{\tilde{s}'(t) \otimes c(t) \cdot e^{j\omega_c t}\},$$

where $\otimes$ is the convolution operator, c(t) is the channel impulse response of the phase shifter 432 (which may be expressed as $c(t) = a \cdot e^{j\varphi}$ for a simple phase shifter). The output signal y'(t) generated by the phase shifter 432 is provided to the receive path 420. Specifically, the real signal component $y'_I(t)$ of the output signal is provided to the in-phase portion of the receive path 420, and the imaginary signal component $y'_Q(t)$ of the output signal is provided to the quadrature portion of the receive path 420.

The real signal component $y'_I(t)$ may be demodulated with the carrier frequency $\omega_c$ by the first mixer 421A and then filtered by the first LPF 422A to generate the real signal component $y_I(t)$ of a receive output signal, and the imaginary signal component $y'_Q(t)$ may be demodulated with the carrier frequency $\omega_c$ by the second mixer 421B and then filtered by the second LPF 422B to generate the imaginary signal component $y_Q(t)$ of the receive output signal.

In some implementations, the first mixer 421A may compensate for the amplitude imbalance $\varepsilon_r$ and the phase imbalance $\theta_r$ in the receive path 420 by demodulating the real signal component $y'_I(t)$ of the output signal with a first receive I/Q imbalance parameter $P_{IQ,R1} = 2 \cdot (1+\varepsilon_r) \cdot \cos(\omega_c t + \theta_r)$, and the second mixer 421B may compensate for the amplitude imbalance $\varepsilon_r$ and the phase imbalance $\theta_r$ in the receive path 420 by demodulating the imaginary signal component $y'_Q(t)$ of the output signal with a second receive I/Q imbalance parameter $P_{IQ,R2} = -2 \cdot (1-\varepsilon_r) \cdot \cos(\omega_c t - \theta_r)$.

The resulting output signal generated by the receive path 420 may be expressed as $\tilde{y}(t) = y_I(t) + j \cdot y_Q(t) = \alpha_r \cdot \tilde{y}'(t) + \beta_r \cdot \tilde{y}'^*(t)$, where the receive path I/Q imbalances may be expressed as:

$$\alpha_r = \cos\theta_r - j \cdot \varepsilon_r \cdot \sin\theta_r$$

$$\beta_r = \varepsilon_r \cdot \cos\theta_r + j \cdot \sin\theta_r.$$

Combining the above equations, the receive output signal may be expressed as:

$$\tilde{y}(t) = (\alpha_t \cdot \alpha_r \cdot c(t) + \beta_t \cdot \beta^*_r \cdot c^*(t)) \otimes \tilde{s}(t) + (\alpha_r \cdot \beta_t \cdot c(t) + \beta_r \cdot \alpha^*_t \cdot c^*(t)) \otimes \tilde{s}^*(t).$$

Assuming that the I/Q imbalances are relatively small, this equation may be approximated as $\tilde{y}(t) \cong c(t) \otimes \tilde{s}(t) + (\gamma_t \cdot c(t) + \gamma_r \cdot c^*(t)) \otimes \tilde{s}^*(t)$, where:

$$\gamma_t = \otimes_t + j \cdot \theta_t$$

$$\gamma_r = \varepsilon_r + j \cdot \theta_r.$$

A Fourier transform (such as a Fast Fourier Transform (FFT)) may be taken of the approximated receiver output signal, for example, such that the frequency-domain expression at tone k may be expressed as:

$$Y_k \cong C_k \cdot S_k + (\gamma_t \cdot C_k + \gamma_r \cdot C^*_{-k}) \cdot S^*_{-k}$$

for $k = -N/2, \ldots, -1, 0, 1, 2, \ldots, N/2-1$, where $Y_k$, $S_k$, and $C_k$ are the FFT outputs at tone k of $\tilde{y}(t)$, $\tilde{s}(t)$, and c(t), respectively, N is the FFT size, and the possible frequency-dependency of the I/Q imbalances are ignored.

In some implementations, the complex envelope of the training signal $\tilde{s}(t) = s_I(t) + j \cdot s_Q(t) = \mu_t$, and $\mu_t = \mu_t^I + \mu_t^Q$, which contains only DC terms due to the orthogonality of OFDM subcarriers, may be used to evaluate the effects of the transmitter and receiver DC offset. In some implementations, the value of $Y_k$ at k=0 may be evaluated to yield:

$$Y_0 \cong C_0 \cdot S_0 + (\gamma_t \cdot C_0 + \gamma_r \cdot C^*_0) \cdot S^*_0$$

and $$Y_0 \cong C_0 \cdot \mu_t + (\gamma_t \cdot C_0 + \gamma_r \cdot C^*_0) \cdot \mu^*_t;$$

where the DC offset appears at the DC subcarrier (k=0) of $\tilde{s}(t)$. Because the DC subcarrier includes the transmit DC offset and the I/Q imbalances at DC, the values of $\gamma_t$ and $\gamma_r$ are determined and the value of $C_0$ is estimated to solve for the value of $\mu_t$. In implementations for which the channel response changes relatively slowly in the frequency domain, the value of $C_0$ may be approximated by $Y_m$, where m=1 or 2 (or another suitably small value).

In some implementations, the transmitter I/Q imbalance $\gamma_t$, the receiver I/Q imbalance $\gamma_r$, and the DC offset value $\mu_t$ (which is related to the TXCL) may be determined using a 4-step calibration operation based on the example model 400 of FIG. 4. In some implementations, an example training signal defined as $\tilde{s}(t) = e^{j\omega_k t}$ may be transmitted through the transmit path 410 and the receive path 420 (via the loopback path 430) to generate the receive output signal $\tilde{y}(t)$.

In the first step, the training signal is transmitted through the calibration path of the transceiver (such as through the transceiver's calibration path) at a tone k with the phase shifter 432 operating in the bypass state, for example, where $S_k = 1$ and $S_{-k} = 0$. Using the above-derived frequency-domain representations of the training signal, it may be shown that $Y_k(\phi_0) \cong C_k(\phi_0)$ and that:

$$Y_{-k}(\phi_0) \cong \gamma_t \cdot C_{-k}(\phi_0) + \gamma_r \cdot C^*_k(\phi_0),$$

where $\phi_0$ is the phase of the phase shifter 432 when operating in the bypass state. The DC terms may be expressed as:

$$Y_0(\phi_0) \cong C_0(\phi_0) \cdot \mu_t + (\gamma_t \cdot C_0(\phi_0) + \gamma_r \cdot C^*_0(\phi_0)) \cdot \mu^*_t;$$

The channel response at DC may be approximated by measuring a tone m near the DC tone, where the value of m may be an integer (such as 1 or 2). Because $C_0(\phi_0) \cong Y_m(\phi_0)$, the DC terms may be rewritten, without the phase shift introduced by the phase shifter 432, as:

$$Y_0 \cong Y_m \cdot \mu_t + (\gamma_t \cdot Y_m + Y_r \cdot Y^*_m) \cdot \mu^*_t.$$

In the second step, the training signal is transmitted through the calibration path of the transceiver at a tone $-k$ with the phase shifter 432 operating in the bypass state. Thus, for in the second step, $\tilde{s}(t) = e^{-j\omega_k t}$, and $S_k = 0$, and $S_{-k} = 1$. The above-derived frequency-domain representations show that $R_{-k}(\phi_0) \cong C_{-k}(\phi_0)$. In this manner, the second step may yield a first linear equation for the transmitter and receiver I/Q imbalances as $Y_{-k}(\phi_0) \cong \gamma_t \cdot R_{-k}(\phi_0) + \gamma_r \cdot Y^*_k(\phi_0)$, where $R_k$ is the frequency-domain representation of the receive output signal when the training signal $\tilde{s}(t) = e^{-j\omega_k t}$ is transmitted through the calibration path of the transceiver.

In some implementations, the phase shifter 432 may be configured to add a phase shift $\phi_1$ to the transmit output signal s'(t) to obtain a second linear equation for the transmitter I/Q imbalance $\gamma_t$ and the receiver I/Q imbalance $\gamma_r$, for example, where $\phi_1 \neq \phi_0$. In some implementations, a difference between the phase shifts $\phi_0$ and $\phi_1$ may be between 10° and 80°. In some other implementations, the difference between the phase shifts $\phi_0$ and $\phi_1$ may be within 10° of 45° (such as between 35° and 55°).

In the third step, the training signal is transmitted through the calibration path of the transceiver with the phase shifter 432 configured to add the phase shift $\phi_1$ to the transmit output signal s'(t), which may result in $Y_k(\phi_1) \cong C_k(\phi_1)$ and $Y_{-k}(\phi_1) \cong \gamma_t \cdot C_{-k}(\phi_1) + \gamma_r \cdot C^*_k(\phi_1)$.

In the fourth step, the training signal is transmitted through the calibration path of the transceiver at tone −k with the phase shifter 432 configured to add a phase shift $\phi_1$ to the transmit output signal s'(t), which may result in $R_k(\phi_1) \cong \gamma_t \cdot C_k(\phi_1) + \gamma_r \cdot C^*_{-k}(\phi_1)$ and $R_{-k}(\phi_1) \cong C_{-k}(\phi_1)$.

The equations derived in the third and fourth steps may be combined to generate a second linear equation for the transmitter I/Q imbalance $\gamma_t$ and the receiver I/Q imbalance $\gamma_r$. In some implementations, the second linear equation for the transmitter and receiver I/Q imbalances may be expressed as $Y_{-k}(\phi_1) \cong \gamma_t \cdot R_{-k}(\phi_1) + \gamma_r \cdot Y^*_k(\phi_1)$. The first and the second linear equations may be used to solve for the transmitter and receiver I/Q imbalances at a tone k. In some implementations, the transmitter and receiver I/Q imbalances may be expressed as:

$$\hat{\gamma}_t = \frac{1}{D}(Y_{-k}(\phi_0) \cdot Y^*_k(\phi_1) - Y_{-k}(\phi_1) \cdot Y^*_k(\phi_0))$$

$$\hat{\gamma}_r = \frac{1}{D}(R_{-k}(\phi_0) \cdot Y_{-k}(\phi_1) - R_{-k}(\phi_1) \cdot Y_{-k}(\phi_0))$$

where the determinant D may be expressed as $$D = R_{-k}(\phi_0) \cdot Y^*_k(\phi_1) - R_{-k}(\phi_1) \cdot Y^*_k(\phi_0).$$

The transmitter and receiver I/Q imbalances $\hat{\gamma}_t$ and $\gamma_r$ may be substituted into the DC term equation derived in the first step to estimate the TXCL correction factor $\mu_t$.

Figure 5:
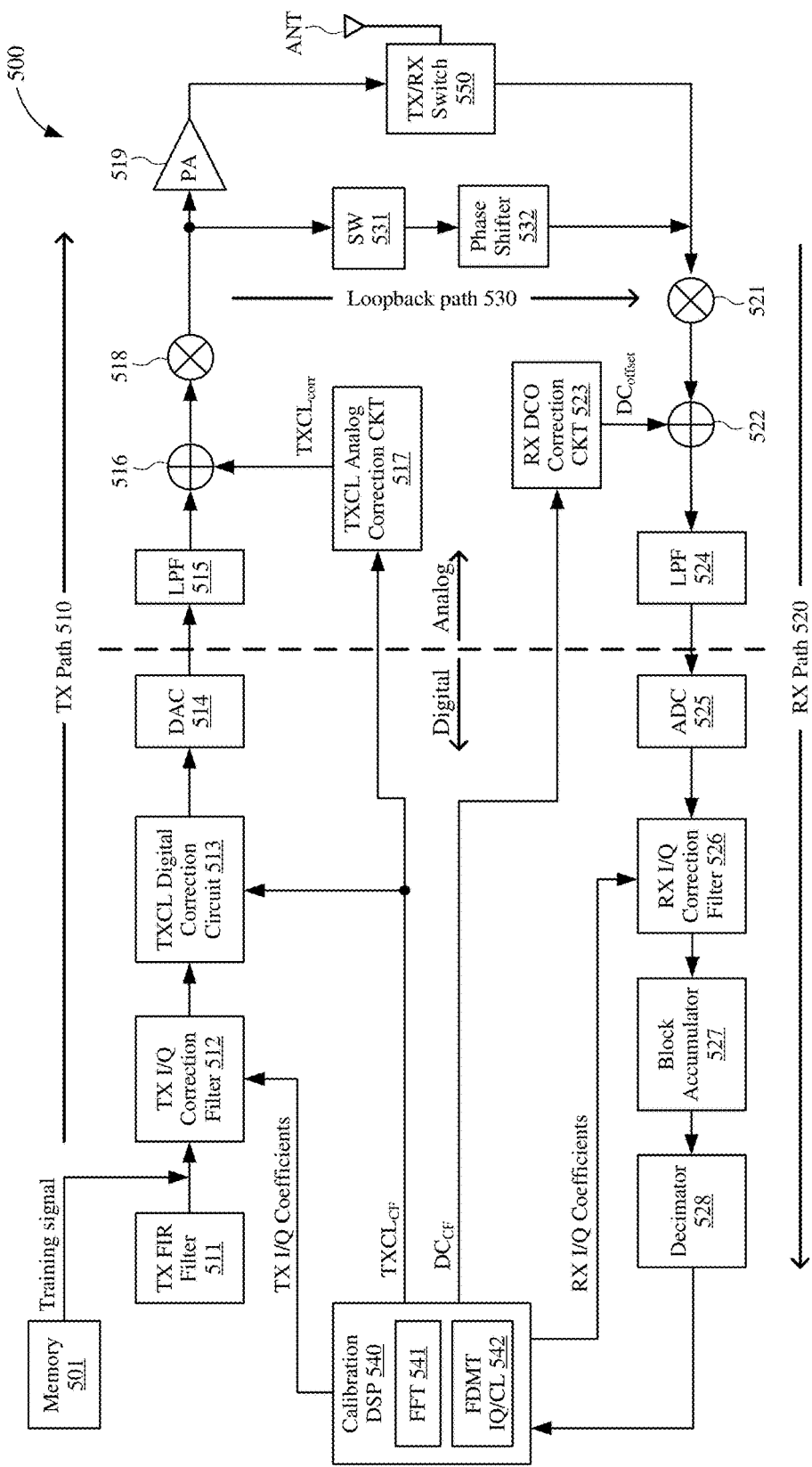
FIG. 5 shows a block diagram of an example calibration path of a QAM transceiver.

FIG. 5 shows a block diagram of an example calibration path 500 of a QAM transceiver. The calibration path 500 may be one implementation of the calibration path of the transceiver 200 of FIG. 2, may be one implementation of the calibration path of the transceivers 311 of FIG. 3, or both. The calibration path 500 may include a transmit path 510, a receive path 520, and a loopback path 530. In some implementations, the transmit path 510 may be modeled by the transmit path 410 of the model 400 of FIG. 4, the receive path 520 may be modeled by the receive path 420 of the model 400 of FIG. 4, and the loopback path 530 may be modeled by the loopback path 430 of the model 400 of FIG. 4.

In some implementations, a memory 501 may store one or more training signals that, when transmitted through the calibration path 500, may be used by a calibration DSP 540 to estimate transmitter I/Q imbalances, receiver I/Q imbalances, and transmit carrier leakage of the transceiver. The calibration DSP 540 may determine transmitter and receiver I/Q imbalance correction filter coefficients based on the estimated transmitter and receiver I/Q imbalances, and may determine one or more TXCL correction factors based on the estimated transmit carrier leakage and the estimated transmitter and receiver I/Q imbalances. The transmitter I/Q imbalance correction filter coefficient, the receiver I/Q imbalance correction filter coefficient, and the TXCL correction factors determined by the calibration DSP 540 may be used to compensate for signal impairments caused by I/Q imbalances and carrier leakage in the transceiver.

In some implementations, the calibration DSP 540 may include an FFT engine 541 and frequency domain multi-tone (FDMT) IQ/CL unit 542. The FFT engine 541 may be used to take a Fast Fourier Transform of training signals captured by the calibration DSP 540. The FDMT IQ/CL unit 542 may be configured to capture FDMT waveforms received from the calibration path 500, to generate frequency domain representations of the captured FDMT waveforms, and to estimate transmitter I/Q imbalances, receiver I/Q imbalances, and transmit carrier leakage of the transceiver based at least in part on the frequency domain representations of the captured FDMT waveforms. The FDMT IQ/CL unit 542 also may be configured to determine a transmitter I/Q imbalance correction filter coefficient, a receiver I/Q imbalance correction filter coefficient, and a TXCL correction factor based at least in part on the estimated transmitter I/Q imbalances, the estimated receiver I/Q imbalances, and the estimated transmit carrier leakage.

The loopback path 530 may selectively couple the transmit path 510 to the receive path 520. For example, when the transceiver operates in a calibration mode, the loopback path 530 is closed and couples the transmit path 510 to the receive path 520, for example, so that a sequence of training signals may be transmitted through the calibration path 500 and processed by the calibration DSP 540. Conversely, when the transceiver operates in a normal mode, the loopback path 530 is open and isolates the transmit path 510 from the receive path 520, for example, so that transmit signals provided on the transmit path 510 may be routed through a TX/RX switch 550 to an antenna ANT for transmission to other wireless devices, and signals received from other wireless devices by the antenna ANT may be routed to the receive path 520 by the TX/RX switch 550.

The transmit path 510 may include a transmit finite impulse response (FIR) filter 511, a TX I/Q correction filter 512, a TXCL digital correction circuit 513, a DAC 514, a LPF 515, a summer 516, a TXCL analog correction circuit 517, a modulator 518, and a power amplifier (PA) 519. The TX I/Q correction filter 512 may compensate for signal impairments caused by transmitter I/Q imbalances in the time domain portion of the transmit path 510 based on one or more transmitter I/Q imbalance correction filter coefficients determined by the calibration DSP 540. In some implementations, the TX I/Q correction filter 512 may use the determined transmitter I/Q imbalance correction filter coefficients to pre-correct for transmitter I/Q signal impairments.

The TXCL digital correction circuit 513 may compensate for carrier leakage signal impairments in the time domain portion of the transmit path 510 based on one or more TXCL correction factors ($TXCL_{corr}$) determined by the calibration DSP 540. In some implementations, the TXCL digital correction circuit 513 may use the determined TXCL correction factors to pre-correct for transmitter carrier leakage signal impairments.

The TXCL analog correction circuit 517 may compensate for signal impairments caused by transmitter I/Q imbalances in the analog portion of the transmit path 510 by providing a TXCL correction signal ($TXCL_{corr}$) to the summer 516. In some implementations, the summer 516 may use the TXCL correction signal for coarse correction of the transmit carrier leakage. In some implementations, the TXCL correction signal may be based on one or more TXCL correction factors ($TXCL_{CF}$) determined by the calibration DSP 540.

The modulator 518 may be used to up-convert transmit signals during a normal operation of the transceiver, for example, by mixing the transmit signals with a transmit local oscillator (LO) signal (not shown for simplicity). In some implementations, the modulator 518 may be one implementation of the first mixer 413A or the second mixer 413B (or both) of the transmit path 410 of FIG. 4. The output of the modulator 518 is coupled to an input of the PA 519. The output of the PA 519 is coupled to the TX/RX switch 550.

The output of the modulator 518 also is coupled to a phase shifter 532 via a switch 531. The switch 531, which may be one implementation of the switch 431 of FIG. 4, may selectively couple the loopback path 530 between the transmit path 510 and the receive path 520 based on the mode signal (not shown in FIG. 5 for simplicity). When the mode signal is in the first state (such as during calibration operations), the switch 531 couples the receive path 520 to the transmit path 510 via the loopback path 530, for example, so that training signals are routed from the transmit path 510 to the receive path 520 through the calibration path 530 via the phase shifter 532. When the mode signal is in the second state (such as during normal or non-calibration operations), the switch 531 isolates the receive path 520 from the transmit path 510. In some implementations, the mode signal may be generated by the calibration DSP 540. In some other implementations, the mode signal may be generated by the processor 330 of FIG. 3 during execution of one or more of the software modules stored in the memory 340.

The phase shifter 532, which may be one implementation of the phase shifter 432 of FIG. 4, may be configured to generate linear independent equations to solve for the transmitter and receiver I/Q imbalances. The phase shifter 532 may selectively add a phase shift into training signals routed from the transmit path 510 to the receive path 520. In some implementations, the phase shifter 532 may operate in two states: a "phase shift state" in which the phase shifter 532 adds a phase shift to the training signals, and a "bypass state" in which the phase shifter 532 does not add a phase shift to the training signals. In some other implementations, the phase shifter 532 may add a first phase shift ($\phi_0$) to the training signals when operating in a first phase shift state, and may add a second phase shift ($\phi_1$) to the training signals when operating in a second phase shift state.

The receive path 520 may include a demodulator 521, a summer 522, receiver DCO correction circuit 523, an LPF 524, an ADC 525, an RX I/Q correction filter 526, a block accumulator 527, and a decimator 528. The demodulator 521 may be used to down-convert received signals during a normal operation of the transceiver, for example, by mixing the received signals with a receive local oscillator (LO) signal (not shown for simplicity). In some implementations, the demodulator 521 may be one implementation of the first mixer 421A or the second mixer 421B (or both) of the receive path 420 of FIG. 4.

The receiver DCO correction 523 may provide a DC offset correction signal ($DC_{offset}$) to the summer 522. In some implementations, the DC offset correction signal may be based on a DC correction factor ($DC_{CF}$) generated by the calibration DSP 540. The RX I/Q correction filter 526 may compensate for signal impairments caused by receiver I/Q imbalances in the time domain portion of the receive path 520 based on one or more receiver I/Q imbalance correction filter coefficients determined by the calibration DSP 540.

The block accumulator 527 may be configured to increase a signal to noise ratio (SNR) of training signals propagated through the receive path 520, for example, by coherently accumulating a number of received samples of the training signals. Because the accuracy with which I/Q imbalances can be estimated is dependent upon noise levels, using the block accumulator 527 to increase the SNR of training signals transmitted through the calibration path may increase the accuracy of I/Q imbalances estimated by the calibration DSP 540. In some implementations, the block accumulator 527 may be a digital time-domain block accumulator. The decimator 528 is coupled between the block accumulator 527 and the calibration circuit 540.

In some implementations, the TX I/Q correction filter 512 and the RX I/Q correction filter 526 each may be a complex FIR filter. In some implementations, the TX I/Q correction filter 512 and the RX I/Q correction filter 526 each may remove frequency-dependent I/Q imbalances using an n-tap I/Q correction filter, for example, by determining an output x according to the following relation:

$$x = d - (z_{df} \otimes d^*),$$

where $z_{df}$ represents the n-tap I/Q correction filter coefficients, $\otimes$ is the convolution operator, and * represents the complex conjugate. In some implementations, the value of n is directly proportional to the amount of frequency-domain variation in the I/Q imbalances. For example, as the frequency-domain variation in the I/Q imbalances increases, the value of n may be increased, and as the frequency-domain variation in the I/Q imbalances decreases, the value of n may be decreases. In some implementations, the n-tap I/Q correction filter coefficients may be based on (or derived from) the estimated I/Q imbalances across all frequency locations.

In some other implementations, one or more frequency-domain multi-tone (FDMT) waveforms may be used as the training signals for estimating the transmitter I/Q imbalances, the receiver I/Q imbalances, and the transmit carrier leakage associated with the transceiver. In some implementations, using FDMT waveforms as the training signals may allow the calibration DSP 540 to contemporaneously estimate transmitter I/Q imbalances and receiver I/Q imbalances based on the transmission of only two FDMT waveforms through the calibration path 500 of the transceiver. In addition, using FDMT waveforms as the training signals may allow the calibration DSP 540 to contemporaneously estimate transmitter I/Q imbalances, receiver I/Q imbalances, and carrier leakage based on the transmission of only three FDMT waveforms through the calibration path 500 of the transceiver.

In some implementations, the FDMT waveforms may be constructed such that the first and second steps of the calibration operation may be performed by transmitting a first FDMT waveform through the calibration path 500, and the third and fourth steps of the calibration operation may be performed by transmitting a second FDMT waveform through the calibration path 500. The selection of tone locations for the FDMT waveforms may be based on the sampling rate for estimating variations in the transmitter and receiver I/Q imbalances. In some implementations, the tone locations of the FDMT waveforms may be selected such that the tones of negative frequencies are designed to not coincide with the locations of tones of corresponding positive frequencies.

More specifically, if the tone locations are selected such that the negative frequency tones are one or two tones offset from image locations of the positive-frequency tones, the first and second steps of the four-step calibration operation may be combined because images of the positive tones do not overlap the negative tones when the transmission of the FDMT waveform at tone k is combined with the transmission of the FDMT waveform at tone −k. In some implementations, the FDMT waveform may be modulated by a known pseudo-random sequence to avoid a large peak to average power (PAPR) in the FDMT waveform.

Figure 6A:
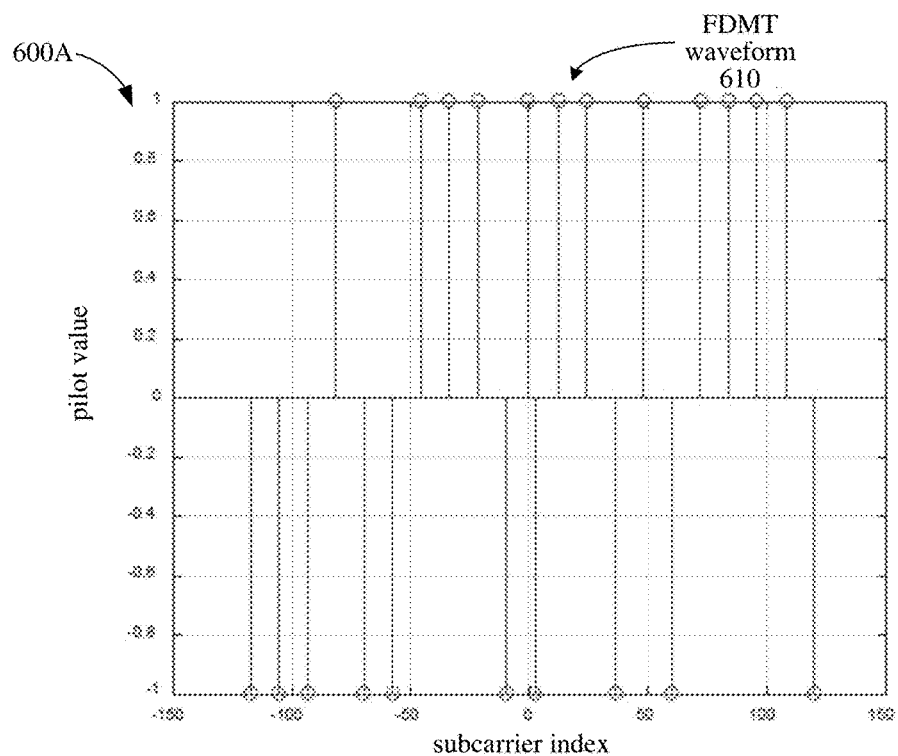
FIG. 6A shows a plot of an example frequency domain multi-tone (FDMT) waveform in the frequency domain.
Figure 6B:
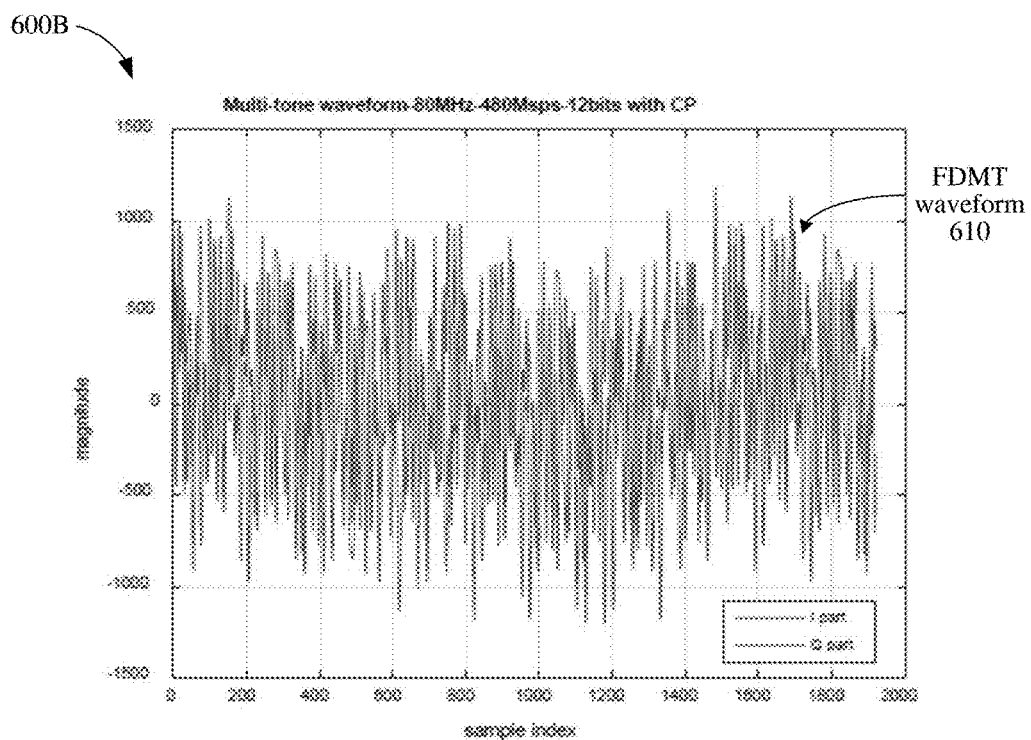
FIG. 6B shows another plot of the example FDMT waveform of FIG. 6A in the time domain.

FIG. 6A shows a plot 600A of an example FDMT waveform 610 in the frequency domain. The plot 600A depicts the pilot values of the example FDMT waveform 610 as a function of its subcarrier index. FIG. 6B shows a plot 600B of the example FDMT waveform 610 in the time domain. The plot 600B depicts the magnitude of the FDMT waveform 610 as a function of its sample index.

The example FDMT waveform 610, which may be stored in the memory 501 of FIG. 5, may have tone locations at $$\{-N_{est} \cdot k_{step} + \delta, \ldots, -k_{step} + \delta, -1, 2, k_{step}, \ldots, N_{est} \cdot k_{step}\}$$

where $N_{est}$=floor($BW_{ch}$/0.3125)/2), $\delta$ is the negative tone offset in subcarriers (2 in the example of FIG. 6A), and $BW_{ch}$ is the channel bandwidth to be calibrated (in MHz). For the example plot 600A of FIG. 6A, the channels are divided into 52 subcarriers each having a bandwidth of approximately 0.3125 MHz, for example, so that the channels and their subcarriers may be suitable for orthogonal frequency-division multiplexing (OFDM) communications. In some implementations, the channel bandwidth $BW_{ch}$ may be 80 MHz, the sampling rate may be 480 MHz (such as 480 million samples per second), and the value of $k_{step}$=12.

During the first step of the four-step operation, if the transmitter and receiver I/Q amplitude and phase imbalances are known, then the transmit DC offset $\mu_t$ may be determined using the following equation:

$$Y_0 \cong Y_m \cdot \mu_t + (\gamma_t \cdot Y_m + \gamma_r \cdot Y^*_m) \cdot \mu^*_t$$

In this manner, the calibration DSP 540 may determine the transmitter I/Q imbalance and the receiver I/Q imbalance, and then derive the transmit DC offset $\mu_t$ from the transmitter and receiver I/Q imbalances. Because the transmit DC offset $\mu_t$ is a complex number representing the transmit DC offset as seen from the baseband frequency domain, there may be a scaling factor $K_1$ between $\mu_t$ and the TXCL correction point in the transceiver. In some implementations, the scaling factor may depend on a gain of the transmit path 510 of the transceiver.

In some implementations, the scaling factor between $\mu_t$ and the TXCL correction point may be determined as follows. First, a first FDMT waveform having a first known TXCL correction value (+$\Delta$) without analog phase shifting (such as when the phase shifter 532 is in the bypass state) is transmitted through the calibration path 500 and captured in the digital domain to generate a first frequency-domain signal that includes the DC value $Y_0^P(\phi_0)$. Next, a second FDMT waveform having a second known TXCL correction value (-$\Delta$) without analog phase shifting is transmitted through the calibration path 500 and captured in the digital domain to generate a second frequency-domain signal that includes the DC value $Y_0^N(\phi_0)$. Then, a third FDMT waveform having no TXCL correction value and with analog phase shifting is transmitted through the calibration path 500 and captured in the digital domain to generate a third frequency-domain signal $\{Y_k(\phi_1)\}$.

Figure 7:
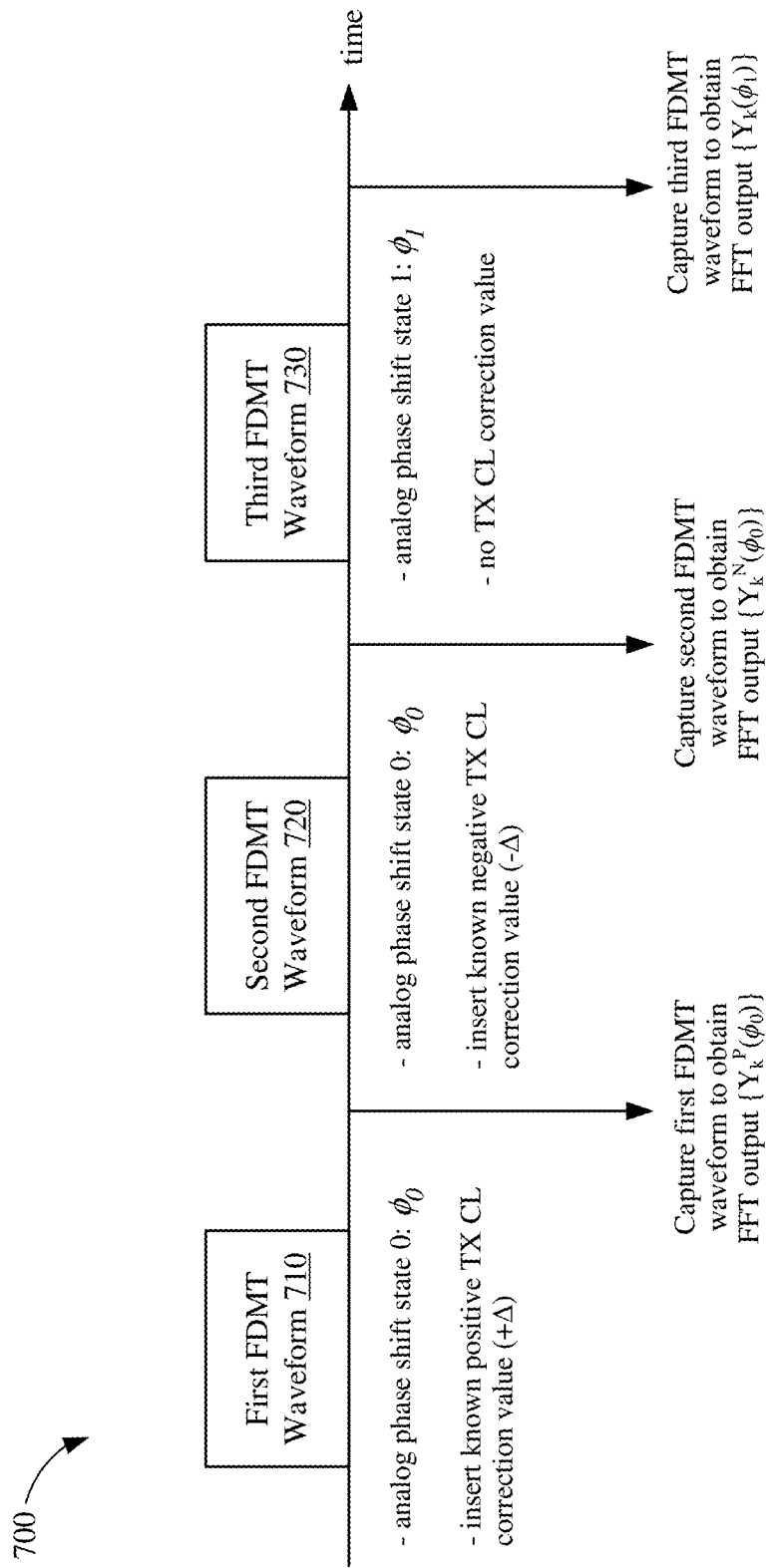
FIG. 7 depicts an example calibration operation using a number of FDMT waveforms.

FIG. 7 depicts an example calibration operation 700 using a number of FDMT waveforms. Although described with respect to the calibration path 500 of FIG. 5, the example calibration operation 700 may be performed by any suitable transceiver (such as the transceiver 200 of FIG. 2 or the transceivers 311 of FIG. 3) or any suitable wireless device (such as the stations STA1-STA4 of FIG. 1, the AP 110 of FIG. 1, or the wireless device 300 of FIG. 3). A first FDMT waveform 710 may be transmitted through the calibration path 500 and captured by the calibration DSP 540 to generate a first frequency-domain output signal denoted as $\{Y_k^P(\phi_0)\}$. In some implementations, the first FDMT waveform 710 may include a first analog phase shift value of $\phi_0$, and the first frequency-domain output signal may be obtained by taking the FFT of the first FDMT waveform 710, for example, to obtain a first frequency-domain signal expressed as $\{Y_k^P(\phi_0)\}$. In some implementations, the first FDMT waveform 710 may include a first known positive TXCL correction value +$\Delta$. In some other implementations, the first FDMT waveform 710 may not include an analog phase shift.

A second FDMT waveform 720 may be transmitted through the calibration path 500 and captured by the calibration DSP 540 to generate a second frequency-domain output signal denoted as $\{Y_k^N(\phi_0)\}$. In some implementations, the second FDMT waveform 720 may include the first analog phase shift value of $\phi_0$, and the second frequency-domain output signal may be obtained by taking the FFT of the second FDMT waveform 720, for example, to obtain a second frequency-domain signal expressed as $\{Y_k^N(\phi_0)\}$. In some implementations, the second FDMT waveform 720 may include a known negative TXCL correction value -$\Delta$. In some other implementations, the second FDMT waveform 720 may not include an analog phase shift.

A third FDMT waveform 730 may be transmitted through the calibration path 500 and captured by the calibration DSP 540 to generate a third frequency-domain output signal denoted as $\{Y_k(\phi_1)\}$. In some implementations, the third FDMT waveform 730 may include a second analog phase shift value of $\phi_1$, and the third frequency-domain output signal may be obtained by taking the FFT of the third FDMT waveform 730, for example, to obtain a third frequency-domain signal expressed as $\{Y_k(\phi_1)\}$. In some implementations, the third FDMT waveform 730 may not include a TXCL correction value. In some implementations, the first, second, and third frequency-domain output signals may be combined to estimate the transmitter and receiver I/Q imbalances across all frequency locations (such as across an entire bandwidth) of the transceiver, and the transmit carrier leakage of the transceiver, contemporaneously.

In some implementations, the calibration operation may include three steps: in the first step, the calibration DSP 540 may calculate $\{Y_k(\phi_0)\} = \{Y_k^P(\phi_0) + Y_k^N(\phi_0)\}/2$ for values of $k$; in the second step, the calibration DSP 540 may use $\{Y_k(\phi_0)\}$ and $\{Y_k(\phi_1)\}$ to estimate the transmitter and receiver I/Q imbalances; and in the third step, the calibration DSP 540 may use $Y_0^P(\phi_0)$, $Y_0^N(\phi_0)$, $Y_m(\phi_0)$, and the estimated transmitter and receiver I/Q imbalances to determine the scaling factor $K_1$ and the transmit carrier leakage correction factor $\mu_t$, where m=2.

Although the DC tone values of the first frequency-domain output signal $\{Y_k^P(\phi_0)\}$ and the second frequency-domain output signal $\{Y_k^N(\phi_0)\}$ may differ because of the insertion of the first and second known TXCL correction values +$\Delta$ and -$\Delta$ into the first and second FDMT waveforms, respectively, other tone values of the first and second frequency-domain output signals remain constant (excluding variation in noise). The third frequency-domain output signal may be expressed as a function of the first and second frequency-domain output signals, for example, using the expression $$\{Y_k(\phi_0)\} = \left\{ \frac{Y_k^P(\phi_0) + Y_k^N(\phi_0)}{2} \right\}.$$

The resulting value $\{Y_k(\phi_0)\}$ may be combined with the value $\{Y_k(\phi_1)\}$ to estimate the transmitter I/Q imbalance and the receiver I/Q imbalance contemporaneously.

After determining the transmitter and receiver I/Q imbalance parameters ($\hat{\gamma}_t, \hat{\gamma}_r$), the scaling factor $K_1$ and the TXCL correction factor $\mu_t$ may be determined as follows. First, as noted above:

$$Y_0 \cong Y_m \cdot \mu_t + (\gamma_t \cdot Y_m + Y_r \cdot Y^*_m) \cdot \mu^*_t$$

Including the first and second known TXCL correction values +Δ and −Δ may allow the first and second frequency-domain output signals to be expressed as:

$$Y_0^P \cong Y_m \cdot \left(\mu_t + \frac{\Delta}{K_1}\right) + (\hat{\gamma}_t \cdot Y_m + \hat{\gamma}_{r*} \cdot Y_m^*) \cdot \left(\mu_t^* + \frac{\Delta}{K_1}\right)$$

and $$Y_0^N \cong Y_m \cdot \left(\mu_t - \frac{\Delta}{K_1}\right) + (\hat{\gamma}_t \cdot Y_m + \hat{\gamma}_{r*} \cdot Y_m^*) \cdot \left(\mu_t^* - \frac{\Delta}{K_1}\right)$$

and the scaling factor may be solved for as:

$$K_1 = \frac{2 \cdot \Delta \cdot [Y_m + (\hat{\gamma}_t \cdot Y_m + \hat{\gamma}_{r*} \cdot Y_m^*)]}{Y_0^P - Y_0^N}$$

The TXCL correction factor $\mu_t$ may be determined by adding the DC components into the first and second frequency-domain output signals such that:

$$Y_0 = \frac{Y_0^P + Y_0^N}{2} = Y_m \cdot \mu_t + (\hat{\gamma}_t \cdot Y_m + \hat{\gamma}_{r*} \cdot Y_m^*) \cdot \mu_t^*.$$

Let $$c = Y_m, y = \frac{Y_0^P + Y_0^N}{2}, \mu = \mu_t,$$

and $g = \hat{\gamma}_t \cdot Y_m + \hat{\gamma}_{r*} \cdot Y_m^*$. The real and imaginary parts of the TXCL correction factor $\mu_t$ may be expressed as:

$$\mu_I = \frac{1}{D}[y_I \cdot (c_I - g_I) - y_Q \cdot (g_Q - c_Q)] \text{ and } \mu_Q =$$

$$\frac{1}{D}[y_Q \cdot (c_I + g_I) - y_I \cdot (g_Q + c_Q)],$$

where the subscripts I and Q refer to the real and imaginary portions of a complex quantity. The TXCL correction values, which may be expressed as correction$_I = \mu_I \cdot K_1$ and correction$_Q = \mu_Q \cdot K_1$, may be applied to a correction point of the transceiver. In some implementations, the TXCL correction values may be provided to either the TXCL digital correction circuit 513 or the TXCL analog correction circuit 517. In some other implementations, the TXCL correction values may be provided to both the TXCL digital correction circuit 513 and the TXCL analog correction circuit 517. The TXCL correction values may be given as correction$_I = \mu_I \cdot K_1$ and correction$_Q = \mu_Q \cdot K_1$.

FIG. 8 shows an illustrative flow chart depicting an example operation 800 for calibrating a QAM transceiver. Although described with respect to the calibration path 500 and the calibration DSP 540 of FIG. 5, the example operation 800 may be performed by any suitable processor or circuit within in any suitable transceiver (such as the transceiver 200 of FIG. 2 or the transceivers 311 of FIG. 3) by transmitting a sequence of training signals through the calibration path of a transceiver. In some implementations, the calibration path includes a transmit path and a receive path in the transceiver. In some other implementations, the calibration path includes a transmit path, a receive path, and a loopback path of the transceiver.

The calibration DSP 540 provides a calibration path including at least a transmit path and a receive path of the wireless transceiver (801). Referring to FIG. 5, the calibration DSP 540 may provide the calibration path by driving the mode signal to the first state, for example, so that the switch 531 couples the transmit path 510 to the receive path 520 via the loopback path 530.

The calibration DSP 540 captures a first frequency-domain multi-tone (FDMT) signal transmitted through the calibration path of the transceiver (802), and generates a frequency-domain representation of the first captured FDMT signal (804). In some implementations, the first FDMT signal may be transmitted through the transmit path 510 and the receive path 520 via the loopback path 530 of FIG. 5 without an analog phase shift, and then captured in the time-domain by the calibration DSP 540. In some other implementations, the first FDMT signal may be transmitted through the transmit path 510 and the receive path 520 via the loopback path 530 of FIG. 5 with a first phase shift $\phi_0$, and then captured in the time-domain by the calibration DSP 540. The calibration DSP 540 may generate the frequency-domain representation of the first captured FDMT signal using a Fourier Transform (such as an FFT). In some implementations, the first FDMT signal may be the first FDMT waveform 710 of FIG. 7.

The calibration DSP 540 captures a second FDMT signal transmitted through the calibration path (806), and generates a frequency-domain representation of the second captured FDMT signal (808). In some implementations, the second FDMT signal may be transmitted through the transmit path 510 and the receive path 520 via the loopback path 530 of FIG. 5 without an analog phase shift, and then captured in the time-domain by the calibration DSP 540. In some other implementations, the second FDMT signal may be transmitted through the transmit path 510 and the receive path 520 via the loopback path 530 of FIG. 5 with the first phase shift $\phi_0$, and then captured in the time-domain by the calibration DSP 540. The calibration DSP 540 may generate the frequency-domain representation of the second captured FDMT signal using a Fourier Transform (such as an FFT). In some implementations, the second FDMT signal may be the second FDMT waveform 720 of FIG. 7.

The calibration DSP 540 captures a third FDMT signal transmitted through the calibration path (810), and generates a frequency-domain representation of the third captured FDMT signal (812). In some implementations, the third FDMT signal may be transmitted through the transmit path 510 and the receive path 520 via the loopback path 530 of FIG. 5 with an analog phase shift, and then captured in the time-domain by the calibration DSP 540. In some other implementations, the third FDMT signal may be transmitted through the transmit path 510 and the receive path 520 via the loopback path 530 of FIG. 5 with a second phase shift $\phi_1$, and then captured in the time-domain by the calibration DSP 540. The calibration DSP 540 may generate the frequency-domain representation of the third captured FDMT signal using a Fourier Transform (such as an FFT). In some implementations, the third FDMT signal may be the third FDMT waveform 730 of FIG. 7.

The calibration DSP 540 estimates transmitter I/Q imbalances and receiver I/Q imbalances across an entire bandwidth of the wireless transceiver, and the transmit carrier leakage in the wireless transceiver, contemporaneously based at least in part on the frequency-domain representations of the first, second, and third captured FDMT signals (814). In some other implementations, the transmitter and receiver I/Q imbalances may be estimated by executing the transmitter and receiver I/Q imbalance SW module 344 of the wireless device 300 of FIG. 3 and the transmit carrier leakage may be estimated by executing the transmit carrier leakage determination SW module 345 of the wireless device 300 of FIG. 3.

The calibration DSP 540 determines a transmitter I/Q imbalance correction filter coefficient, a receiver I/Q imbalance correction filter coefficient, and a transmit carrier leakage correction factor contemporaneously based on the estimated transmitter I/Q imbalances, the estimated receiver I/Q imbalances, and the estimated transmit carrier leakage (816). In some other implementations, the transmitter and receiver I/Q imbalance correction filter coefficients may be determined by executing the transmitter and receiver I/Q imbalance SW module 344 of the wireless device 300 of FIG. 3, and the transmit carrier leakage correction factor may be determined by executing the transmit carrier leakage determination SW module 345 of the wireless device 300 of FIG. 3.

As used herein, a phrase referring to "at least one of" a list of items refers to any combination of those items, including single members. As an example, "at least one of: a, b, or c" is intended to cover: a, b, c, a-b, a-c, b-c, and a-b-c.

The various illustrative logics, logical blocks, modules, circuits and algorithm processes described in connection with the implementations disclosed herein may be implemented as electronic hardware, computer software, or combinations of both. The interchangeability of hardware and software has been described generally, in terms of functionality, and illustrated in the various illustrative components, blocks, modules, circuits and processes described throughout. Whether such functionality is implemented in hardware or software depends upon the particular application and design constraints imposed on the overall system.

The hardware and data processing apparatus used to implement the various illustrative logics, logical blocks, modules and circuits described in connection with the aspects disclosed herein may be implemented or performed with a general purpose single- or multi-chip processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, or, any conventional processor, controller, microcontroller, or state machine. A processor also may be implemented as a combination of computing devices, such as a combination of a DSP and a microprocessor, a plurality of microprocessors, one or more microprocessors in conjunction with a DSP core, or any other such configuration. In some implementations, particular processes and methods may be performed by circuitry that is specific to a given function.

In one or more aspects, the functions described may be implemented in hardware, digital electronic circuitry, computer software, firmware, including the structures disclosed in this specification and their structural equivalents thereof, or in any combination thereof. Implementations of the subject matter described in this specification also can be implemented as one or more computer programs, i.e., one or more modules of computer program instructions, encoded on a computer storage media for execution by, or to control the operation of, data processing apparatus.

If implemented in software, the functions may be stored on or transmitted over as one or more instructions or code on a computer-readable medium. The processes of a method or algorithm disclosed herein may be implemented in a processor-executable software module which may reside on a computer-readable medium. Computer-readable media includes both computer storage media and communication media including any medium that can be enabled to transfer a computer program from one place to another. A storage media may be any available media that may be accessed by a computer. By way of example, and not limitation, such computer-readable media may include RAM, ROM, EEPROM, CD-ROM or other optical disk storage, magnetic disk storage or other magnetic storage devices, or any other medium that may be used to store desired program code in the form of instructions or data structures and that may be accessed by a computer. Also, any connection can be properly termed a computer-readable medium. Disk and disc, as used herein, includes compact disc (CD), laser disc, optical disc, digital versatile disc (DVD), floppy disk, and Blu-Ray disc where disks usually reproduce data magnetically, while discs reproduce data optically with lasers. Combinations of the above should also be included within the scope of computer-readable media. Additionally, the operations of a method or algorithm may reside as one or any combination or set of codes and instructions on a machine readable medium and computer-readable medium, which may be incorporated into a computer program product.

Various modifications to the implementations described in this disclosure may be readily apparent to those skilled in the art, and the generic principles defined herein may be applied to other implementations without departing from the spirit or scope of this disclosure. Thus, the claims are not intended to be limited to the implementations shown herein, but are to be accorded the widest scope consistent with this disclosure, the principles and the novel features disclosed herein.

What is claimed is:
1. A wireless transceiver, comprising:
 a calibration path including at least a transmit path and a receive path in the wireless transceiver; and
 a calibration processor configured to:
  capture a first frequency-domain multi-tone (FDMT) signal transmitted through the calibration path;
  generate a frequency-domain representation of the first captured FDMT signal;
  capture a second FDMT signal transmitted through the calibration path;
  generate a frequency-domain representation of the second captured FDMT signal;
  capture a third FDMT signal transmitted through the calibration path;
  generate a frequency-domain representation of the third captured FDMT signal;
  estimate transmitter in-phase and quadrature (I/Q) imbalances and receiver I/Q imbalances across an entire bandwidth of the wireless transceiver, and the transmit carrier leakage in the wireless transceiver, contemporaneously based at least in part on the frequency-domain representations of the first, second, and third captured FDMT signals;
  wherein the estimated transmitter and receiver I/Q imbalances are based on an average of the frequency-domain representations of the first and second captured FDMT signals, and the frequency-domain representation of the third captured FDMT signal; and determine a transmitter I/Q imbalance correction filter coefficient, a receiver I/Q imbalance correction filter coefficient, and a transmit carrier leakage correction factor contemporaneously based on the estimated I/Q imbalances and the estimated transmit carrier leakage.

2. The wireless transceiver of claim 1, wherein the calibration processor includes a digital signal processor (DSP) capable of capturing the FDMT signals in the time-domain and to take a Fourier Transform of the captured signals to generate the frequency-domain representations.

3. The wireless transceiver of claim 1, wherein each of the first and second FDMT signals includes a number of first tones associated with negative frequencies and includes a number of second tones associated with positive frequencies, the first tones offset from the second tones by at least one tone location.

4. The wireless transceiver of claim 1, wherein the first FDMT signal includes a known positive transmit carrier leakage correction value, the second FDMT signal includes a known negative transmit carrier leakage correction value, and the third FDMT signal does not include any transmit carrier leakage correction value.

5. The wireless transceiver of claim 1, further comprising: an analog summer provided in the transmit path and configured to compensate for the carrier leakage based on the determined transmit carrier leakage correction factor.

6. The wireless transceiver of claim 1, further comprising: a digital corrector provided in the transmit path and configured to compensate for the carrier leakage based on the determined correction factor.

7. The wireless transceiver of claim 1, further comprising an analog phase shifter configured to:
add a first phase shift to each of the first and second FDMT signals; and
add a second phase shift to the third FDMT signal, the first phase shift different from the second phase shift.

8. The wireless transceiver of claim 1, further comprising:
a first correction filter provided in the transmit path and configured to compensate for transmitter I/Q imbalances based on the determined transmitter I/Q imbalance correction filter coefficient; and
a second correction filter provided in the receive path and configured to compensate for receiver I/Q imbalances based on the determined receiver I/Q imbalance correction filter coefficient.

9. The wireless transceiver of claim 1, further comprising:
a block accumulator provided in the receive path and configured to coherently accumulate a number of blocks of each of the FDMT signals.

10. A method for compensating for signal impairments in a wireless transceiver, comprising:
providing a calibration path including at least a transmit path and a receive path of the wireless transceiver;
capturing a first frequency-domain multi-tone (FDMT) signal transmitted through the calibration path;
generating a frequency-domain representation of the first captured FDMT signal;
capturing a second FDMT signal transmitted through the calibration path;
generating a frequency-domain representation of the second captured FDMT signal;

capturing a third FDMT signal transmitted through the calibration path;
generating a frequency-domain representation of the third captured FDMT signal;
estimating transmitter in-phase and quadrature (I/Q) imbalances and receiver I/Q imbalances across an entire bandwidth of the wireless transceiver, and the transmit carrier leakage in the wireless transceiver, contemporaneously based at least in part on the frequency-domain representations of the first, second, and third captured FDMT signals;
wherein the first FDMT signal includes a known positive transmit carrier leakage correction value, the second FDMT signal includes a known negative transmit carrier leakage correction value, and the third FDMT signal does not include any transmit carrier leakage correction value; and
determining a transmitter I/Q imbalance correction filter coefficient, a receiver I/Q imbalance correction filter coefficient, and a transmit carrier leakage correction factor contemporaneously based on the estimated I/Q imbalances and the estimated transmit carrier leakage.

11. The method of claim 10, wherein the estimated transmitter and receiver I/Q imbalances are based on:
an average of the frequency-domain representations of the first and second captured FDMT signals; and
the frequency-domain representation of the third captured FDMT signal.

12. The method of claim 10, wherein the FDMT signals are captured in the time-domain and converted to the frequency-domain representations using a Fourier Transform of the captured signals.

13. The method of claim 10, wherein each of the first and second FDMT signals includes a number of first tones associated with negative frequencies and includes a number of second tones associated with positive frequencies, the first tones offset from the second tones by at least one tone location.

14. The method of claim 10, further comprising:
providing the determined transmit carrier leakage correction factor to an analog summer provided in the transmit path.

15. The method of claim 10, further comprising:
adding a first phase shift to each of the first and second FDMT signals; and
adding a second phase shift to the third FDMT signal, the first phase shift different from the second phase shift.

16. The method of claim 10, further comprising:
providing the determined transmitter I/Q imbalance correction filter coefficient to a first correction filter provided in the transmit path; and
providing the determined receiver I/Q imbalance correction filter coefficient to a second correction filter provided in the receive path.

17. The method of claim 10, further comprising:
coherently accumulating a number of blocks of each of the FDMT signals.

18. A non-transitory computer-readable storage medium comprising instructions that, when executed by one or more processors of a wireless transceiver, cause the wireless transceiver to compensate for signal impairments by performing operations comprising:
providing a calibration path including at least a transmit path and a receive path in the wireless transceiver;
capturing a first frequency-domain multi-tone (FDMT) signal transmitted through the calibration path;

generating a frequency-domain representation of the first captured FDMT signal;
capturing a second FDMT signal transmitted through the calibration path;
generating a frequency-domain representation of the second captured FDMT signal;
capturing a third FDMT signal transmitted through the calibration path;
generating a frequency-domain representation of the third captured FDMT signal;
estimating transmitter in-phase and quadrature (I/Q) imbalances and receiver I/Q imbalances across an entire bandwidth of the wireless transceiver, and the transmit carrier leakage in the wireless transceiver, contemporaneously based at least in part on the frequency-domain representations of the first, second, and third captured FDMT signals;
 wherein the first FDMT signal includes a known positive transmit carrier leakage correction value, the second FDMT signal includes a known negative transmit carrier leakage correction value, and the third FDMT signal does not include any transmit carrier leakage correction value; and
determining a transmitter I/Q imbalance correction filter coefficient, a receiver I/Q imbalance correction filter coefficient, and a transmit carrier leakage correction factor contemporaneously based on the estimated I/Q imbalances and the estimated transmit carrier leakage.

19. The non-transitory computer-readable storage medium of claim 18, wherein the estimated transmitter and receiver I/Q imbalances are based on:
an average of the frequency-domain representations of the first and second captured FDMT signals; and
the frequency-domain representation of the third captured FDMT signal.

20. The non-transitory computer-readable storage medium of claim 18, wherein the FDMT signals are captured in the time-domain and converted to the frequency-domain representations using a Fourier Transform of the captured signals.

21. The non-transitory computer-readable storage medium of claim 18, wherein each of the first and second FDMT signals includes a number of first tones associated with negative frequencies and includes a number of second tones associated with positive frequencies, the first tones offset from the second tones by at least one tone location.

22. The non-transitory computer-readable storage medium of claim 18, wherein execution of the instructions causes the wireless transceiver to perform operations further comprising:
providing the determined transmit carrier leakage correction factor to an analog summer provided in the transmit path.

23. The non-transitory computer-readable storage medium of claim 18, wherein execution of the instructions causes the wireless transceiver to perform operations further comprising:
adding a first phase shift to each of the first and second FDMT signals; and
adding a second phase shift to the third FDMT signal, the first phase shift different from the second phase shift.

24. The non-transitory computer-readable storage medium of claim 18, wherein execution of the instructions causes the wireless transceiver to perform operations further comprising:
providing the determined transmitter I/Q imbalance correction filter coefficient to a first correction filter provided in the transmit path; and
providing the determined receiver I/Q imbalance correction filter coefficient to a second correction filter provided in the receive path.

25. The non-transitory computer-readable storage medium of claim 18, wherein execution of the instructions causes the wireless transceiver to perform operations further comprising:
coherently accumulating a number of blocks of each of the FDMT signals.

26. A wireless device, comprising:
a calibration path including at least a transmit path and a receive path in the wireless transceiver;
means for capturing a first frequency-domain multi-tone (FDMT) signal transmitted through the calibration path;
means for generating a frequency-domain representation of the first captured FDMT signal;
means for capturing a second FDMT signal transmitted through the calibration path;
means for generating a frequency-domain representation of the second captured FDMT signal;
means for capturing a third FDMT signal transmitted through the calibration path;
means for generating a frequency-domain representation of the third captured FDMT signal;
means for estimating transmitter in-phase and quadrature (I/Q imbalances and receiver I/Q imbalances across an entire bandwidth of the wireless transceiver, and the transmit carrier leakage in the wireless transceiver, contemporaneously based at least in part on the frequency-domain representations of the first, second, and third captured FDMT signals;
 wherein the estimated transmitter and receiver I/O imbalances are based on an average of the frequency-domain representations of the first and second captured FDMT signals, and the frequency-domain representation of the third captured FDMT signal; and
means for determining a transmitter I/Q imbalance correction filter coefficient, a receiver I/Q imbalance correction filter coefficient, and a transmit carrier leakage correction factor contemporaneously based on the estimated I/Q imbalances and the estimated transmit carrier leakage.

* * * * *